United States Patent
Sekiya

(10) Patent No.: US 7,106,499 B2
(45) Date of Patent: *Sep. 12, 2006

(54) RAMAN AMPLIFICATION CONTROL METHOD, OPTICAL COMMUNICATION SYSTEM, OPTICAL AMPLIFIER AND PROGRAM

(75) Inventor: Kayato Sekiya, Tokyo (JP)

(73) Assignee: NEC Corporation, Tokyo (JP)

( * ) Notice: Subject to any disclaimer, the term of this patent is extended or adjusted under 35 U.S.C. 154(b) by 306 days.

This patent is subject to a terminal disclaimer.

(21) Appl. No.: 10/280,012

(22) Filed: Oct. 25, 2002

(65) Prior Publication Data

US 2004/0085621 A1 May 6, 2004

(30) Foreign Application Priority Data

Oct. 26, 2001 (JP) .............................. 2001-328975

(51) Int. Cl.
*H01S 3/00* (2006.01)

(52) U.S. Cl. ..................................... 359/334
(58) Field of Classification Search ................. 359/334
See application file for complete search history.

(56) References Cited

U.S. PATENT DOCUMENTS

| | | | | |
|---|---|---|---|---|
| 6,417,959 B1 * | 7/2002 | Bolshtyansky et al. | ..... | 359/334 |
| 6,512,628 B1 * | 1/2003 | Terahara et al. | ............ | 359/334 |
| 6,611,370 B1 * | 8/2003 | Namiki et al. | ............... | 359/334 |
| 6,624,926 B1 * | 9/2003 | Hayashi et al. | .............. | 359/334 |
| 6,624,927 B1 * | 9/2003 | Wong et al. | ................. | 359/334 |
| 6,687,049 B1 * | 2/2004 | Sulhoff et al. | ........... | 359/341.4 |
| 6,739,727 B1 * | 5/2004 | Sekiya | ........................ | 359/334 |
| 6,775,055 B1 * | 8/2004 | Tsuzaki et al. | ............. | 359/334 |
| 6,785,042 B1 * | 8/2004 | Onaka et al. | ................ | 359/334 |
| 6,798,567 B1 * | 9/2004 | Feldman et al. | ........ | 359/341.42 |
| 2002/0024723 A1 * | 2/2002 | Sekiya et al. | ............ | 359/337.1 |
| 2004/0156095 A1 * | 8/2004 | Tsuzaki et al. | ............. | 359/334 |

FOREIGN PATENT DOCUMENTS

| | | |
|---|---|---|
| JP | 2000-98433 | 4/2000 |
| JP | 2000-314902 | 11/2000 |
| JP | 2000-330145 | 11/2000 |
| JP | 2001-7768 | 1/2001 |

OTHER PUBLICATIONS

P.B. Hansen, et al., "Rayleigh Scattering Limitations in Distributed Raman Pre-Amplifiers," Jan. 1998, IEEE Photonics Technology Letters, pp. 161, vol. 10, No. 1.

H. Suzuki, et al., "Seamless 32×10 Gb/s transmission over 320 km of 1.55 μm dispersion-shifted fiber using wavelengths ranging from 1546 nm to 1587 nm," NTT Optical Network Systems Laboratories, p. 221-223, no date.

* cited by examiner

Primary Examiner—Deandra M. Hughes
(74) Attorney, Agent, or Firm—Dickstein Shapiro LLP

(57) ABSTRACT

Power of signal light injected to a Raman amplification medium is measured or estimated by calculation and ratio of the gain between forward pump light and backward pump light is controlled according to the result of the measurement or calculation. Wavelengths used in the forward pumping are optimally allocated.

15 Claims, 27 Drawing Sheets

RAMAN AMPLIFICATION CONTROL METHOD, OPTICAL COMMUNICATION SYSTEM, OPTICAL AMPLIFIER AND PROGRAM

BACKGROUND OF THE INVENTION

1. Field of the Invention

The present invention is utilized in an optical communication. Particularly, the present invention relates to a technique for suppressing degradation of signal quality due to input signal power variation.

2. Description of Related Art

In the WDM (Wavelength Division Multiplex) optical transmission system, a plurality of signal channels having different wavelengths are transmitted simultaneously through an optical fiber. Therefore, the WDM optical transmission system is advantageous in that transmission capacity per optical fiber can be increased by increasing the number of wavelengths, saving the number of optical fibers.

The WDM optical transmission system mainly consists of (1) an optical transmitter provided at the transmitting end of an optical transmission line, (2) an optical receiver provided at the receiving end thereof and (3) the optical transmission line between the optical transmitter and the optical receiver. The optical transmission line usually consists of (A) a plurality of optical amplifiers (for example, erbium-doped optical fiber amplifiers) for amplifying WDM light signal and (B) a plurality of optical fibers for connecting the optical amplifiers mutually.

Signal quality of an optical signal transmitted from the optical transmitter degrades while traversing through the optical transmission line. The degradation of signal quality is caused mainly by ASE (Amplified Spontaneous Emission) and nonlinear waveform distortion. ASE is a constant amount of random light produced by the optical amplifier and nonlinear waveform distortion is a waveform distortion caused by time-dependent nonlinear refractive index changes in the transmission fiber induced by signal light pulses. The distortion increases with the signal light power.

The signal degradation due to ASE tends to increase with decreasing signal power at the output of the optical transmission line. This is because the input of an optical amplifier is usually connected to the output of the optical transmission line. Since the optical amplifier usually generates a constant amount of optical noise, ratio of signal light to ASE, that is, signal-to-noise ratio (SNR) degrades when signal power at the output of the optical transmission line decreases. That is, in order to reduce influence of ASE on the signal light, larger signal power is preferable at the output of the optical transmission line.

The degradation of signal quality due to nonlinear waveform distortion tends to increase with increasing signal power at the input of the optical transmission line. This is because nonlinear refractive index variation, which is the cause of nonlinear waveform distortion, increases with increase in signal power. Therefore, in order to suppress the influence of nonlinear waveform distortion on the signal quality, smaller signal power is preferable at the input of the optical transmission line.

Therefore, for suppressing the signal quality degradations from both ASE and nonlinear waveform distortion, larger signal power is preferable at the output of the optical transmission line while smaller input power is preferable at the input of the transmission line. However, since the output signal light power and the input signal light power are in one-to-one relation, the difference of the two powers being the loss of the optical transmission line, the above two conditions cannot be satisfied simultaneously. Therefore, the powers of the output and input signal lights are set so as to minimize the total degradation.

Even with the optimal signal power setting, it is impossible to completely remove the two degradations. Further, since both of the degradations accumulates while the signal light passes through a plurality of optical amplifiers and optical transmission fibers, maximum transmission distance, that is, length of the optical transmission system is limited by the accumulated degradations.

In order to relax this limitation on the maximum transmission distance, a method and a system utilizing Raman amplification has been proposed. Raman amplification is a phenomenon in which a signal light is amplified within an transmission fiber when light, which is referred to as pump light having specific wavelength different from that of the signal light, are launched simultaneously into the optical fiber.

There are three configurations for a system using Raman amplification: "backward pumping" configuration in which amplification is performed by using a pump light (referred to as backward pump light) propagating in the opposite direction to the signal light; the "forward pumping" configuration in which amplification is performed by using a pump light (referred to as forward pump light) propagating in the same direction as the signal light; and "bidirectional pumping" configuration in which amplification is performed by using both the backward pump light and the forward pump light. In any of these three system configurations, it is possible to improve the signal quality compared to systems which does not utilize Raman amplification, by appropriately setting the optical signal power at the input terminal of the optical transmission line.

For example, an improvement in signal quality by utilizing the backward pumping will be described with reference to FIG. 27. Curve (a) in FIG. 27 shows the signal power distribution in an optical transmission fiber in an optical communication system without Raman amplification. The average power of all wavelength channels is employed for simplicity. When the backward pump light is injected into the optical transmission line from the output terminal, the signal light is amplified in the optical fiber, as shown by curve (b) in FIG. 27. As a result, signal light power at the output of the optical transmission fiber is increased, reducing the influence of ASE generated by an optical amplifier connected to the output terminal. Therefore, the signal quality is improved.

An improvement in signal quality by utilizing the forward pumping will be described with reference to FIG. 28. Curve (a) in FIG. 28 shows the signal power distribution in an optical transmission fiber in an optical communication system without Raman amplification. When the forward pump light is injected into the optical transmission line from the input terminal, the signal light is amplified as shown by curve (b) in FIG. 28. When the input signal light power is reduced such that the signal light at the output of the optical transmission fiber becomes equal to the level before Raman amplification is applied, the output signal light becomes as shown by curve (c) in FIG. 28. As a result, it becomes possible to lower signal light power while maintaining the output signal power from the optical transmission line, that is, while maintaining the degradation due to ASE constant. Therefore, the nonlinear waveform distortion can be reduced leading to improved signal quality. When the bidirectional pumping configuration is used, it becomes possible to reduce the influences of both the ASE and nonlinear waveform distortion, simultaneously.

Such optical transmission system in which the signal quality is improved by Raman amplification is disclosed in, for example, H. Suzuki et al, Optical Fiber Communication Conference and the International Conference on Integrated Optics and Optical Fiber Communication '99 Technical Digest, ThO4.

It has been known, however, that the Raman amplification improves the signal quality by the above mentioned mechanism on one hand but generates noise peculiar to Raman amplification on the other. Noise peculiar to Raman amplification is, for example, Raman ASE. Since Raman ASE rapidly increases with increase in signal gain by Raman amplification, maximum gain of Raman amplification, which effectively works in improving the signal quality, is limited by Raman ASE.

Assuming the input signal power at the input of an optical transmission fiber is the same and the gain of Raman amplification is the same, an amount of Raman ASE generation is minimum in the forward pumping configuration and maximum in the backward pumping configuration. The amount of Raman ASE generated in the bidirectional pumping configuration is in between the other two configurations.

Degree of signal quality degradation caused by Raman ASE increases with the decrease in the input signal light power into an optical transmission fiber. Therefore, if Raman amplification is used with low input signal power into an optical transmission fiber, degradation due to Raman ASE becomes substantial.

Noise peculiar to Raman such as Raman ASE amplification is disclosed in, for example, P. B. Hansen et al, IEEE Photonics Technology Letters, Vol. 10, No. 1, January 1998, pp.159–161.

Further, since the average signal power inside the optical transmission fiber is increased by Raman amplification, additional nonlinear waveform distortion occurs compared to the system without Raman. If the input signal power at the input of an optical transmission fiber is the same and the gain of Raman amplification is the same, the additional nonlinear waveform distortion is maximum in the forward pumping configuration and Raman amplification is minimum in the backward pumping configuration. The additional nonlinear waveform distortion in the bidirectional pumping configuration is in between the other two constructions.

If gain is obtained by forward pumping without lowering input signal light into the optical transmission line as shown by curve (b) in FIG. 28, the signal light power is higher at any longitudinal position of the optical transmission line, compared to the case without Raman amplification. Therefore, the nonlinear waveform distortion becomes larger compared to the case without Raman amplification.

Incidentally, when the light power is increased only in a later part of the optical transmission fiber in which signal light power is already lowered by loss, and when increase is small as in the case shown by curve (b) in FIG. 27, the additional nonlinear waveform distortion is negligibly small.

Although Raman amplification is accompanied with noise and nonlinear waveform distortion peculiar thereto, it is possible to improve the signal quality compared with the case without Raman amplification by properly designing to suppress influence of these matters.

Further, it is known that, when Raman amplification is utilized, it is possible to compensate, simultaneously with the improvement in signal quality, for the tilting of signal light power with respect to wavelength (wavelength dependency) that originates from propagating through an optical transmission fiber having wavelength-dependent loss. Since the gain characteristics of Raman amplification has wavelength dependency, it is possible to realize gain characteristics opposite to the loss wavelength characteristics of the optical transmission fiber by appropriately selecting wavelength and power of pump light.

Therefore, by using an optical transmission fiber as Raman amplification medium, it becomes possible to maintain at the output of the transmission fiber constant with respect to wavelength. By maintaining WDM signal power constant with respect to wavelength, it is possible to provide uniform signal quality in all wavelength channels.

Particularly, it is possible to compensate for the tilting of signal light power with respect to wavelength, which varies with time, by changing the pump light wavelength and/or the pump light power with time. An example of an optical communication system in which the loss wavelength dependency is compensated for by Raman amplification is disclosed in JP2001-7768A.

In JP2001-7768A, it is described that, when Raman amplification is used, it is preferable to control gain of Raman amplification such that signal light power at the output terminal of an optical fiber transmission fiber becomes uniform with respect to wavelength while at the same time the total output signal light power (total of signal light powers in all wavelength channels thereof) is maintained. This is because when an optical amplifier such as an erbium-doped fiber amplifier is connected to the output of the transmission fiber, change in total signal power would lead to gain tilt provided by the amplifier. When the gain is tilted with respect to wavelength, it becomes impossible to provide uniform signal quality over all wavelength channels.

As mentioned above, it is possible to improve the signal quality in an optical transmission system and to compensate for the loss wavelength dependency of the transmission fiber, which varies with time, by utilizing the conventional technique related to Raman amplification. However, the conventional technique has a problem when input signal power into the optical fiber transmission fiber is changed while the wavelength dependency is kept constant.

Input signal power into may change while wavelength characteristics is kept constant, for example, when the output signal power of an optical amplifier reduces due to trouble with a pumping laser diode, or when the loss of an transmission fiber changes due to reconnection of optical fiber transmission fibers by an optical cross-connect. The optical cross-connect may be of an automatic type using optical switches or of a manual type in which an optical patch panel is manually switched. Further, there may be a case when the system is reconnected to a different set of transmission fibers with different loss after turning off the system for the purpose of system recycling.

For example, in an optical communication system with backwardly pumped Raman amplification which initially operates in the optimal signal light power with which signal degradation is minimum as shown in curve (a) in FIG. 29, when the signal light power is lowered over all wavelength channels as shown by curve (b) in FIG. 29 (the average signal light power of the all wavelength channels is shown in FIG. 29), a control is conventionally performed such that the output power from the optical transmission fiber becomes constant. That is, the control increases pumping light power, so that gain due to Raman amplification is increased. As a result, the average signal power becomes as shown in curve (c) in FIG. 29.

In such state, since the output signal power from the transmission fiber is kept constant by controlling Raman gain, there is no variation in degradation due to ASE generated by a subsequent optical amplifier. However, as mentioned previously, degradation due to Raman ASE increases with decrease in input signal light into the transmission fiber. Therefore, if reduction of signal light power over the whole wavelength channels is large, degradation due to Raman ASE becomes substantial.

This will be described by using the simulation result shown in FIG. 31 and FIG. 32a to FIG. 32c. The abscissa in FIG. 31 is the distance, that is, position along transmission fiber and the ordinate is the average signal light power. Assuming that, initially, an optical communication system operates with the signal light power shown by curve (a) in FIG. 31 and the transmission fiber is a 125 km long single mode fiber, calculated waveform at the input and the output of the transmission fiber for a representative wavelength channel is as shown by waveforms in FIG. 32a and FIG. 32b, respectively. Signal bitrate is 40 Gbit/sec. From these figures, signal degradation due to ASE and nonlinear waveform distortion may be observed. When the signal light power is lowered over all wavelength channels as shown by curve (b) in FIG. 31, a conventional control tried to keep the output power from the transmission fiber constant. That is, in the conventional technique, the control increased the pump power, so that gain due to Raman amplification is increased. As a result, the average signal power distribution becomes as shown by curve (c) in FIG. 31. In this example, the input signal light power is lowered by 10 dB. As a result of the reduction of the input signal light power, the degradation of signal quality due to Raman ASE is increased and the waveform of the signal output from the transmission fiber becomes as shown by the waveform in FIG. 32c. From this, it is clear that degradation due to Raman ASE increased. Further, similar degradation occurs even when the loss of the transmission fiber is increased by 10 dB by such as by switching of connection of the optical fiber.

In a case where the signal light power over all wavelength channels is increased as shown by curve (b) in FIG. 30 in an optical communication system utilizing forwardly pumped Raman amplification which initially operates with the optimal signal light power with which the degradation of signal quality is minimum as shown by curve (a) in FIG. 30, the conventional control is performed to keep the output signal power light from the transmission fiber constant. That is, the control decreases pumping power so that gain due to Raman amplification is decreased. As a result, the average signal light power becomes as shown by curve (c) in FIG. 30.

In this state, since power of the signal light ejected from the transmission fiber is kept constant by controlling Raman gain, the amount of degradation due to ASE generated by a subsequent optical amplifier is not changed. However, since light power is increased in the preceding part of the transmission fiber compared to the power distribution before the increase, additional nonlinear waveform distortion in this portion of the transmission fiber is substantial.

This will be described by using the simulation result shown in FIG. 33, FIG. 34a and FIG. 34b. The abscissa in FIG. 33 is the distance, that is, position along transmission fiber and the ordinate is the average signal light power. Assuming that, initially, the optical communication system operates with the signal light power shown by curve (a) in FIG. 33 and the transmission fiber is a 125 km long single mode optical fiber, the calculated waveform at the input and the output of transmission fiber for a representative wavelength channel become as shown by the waveform in FIG. 34a. Signal bitrate is 40 Gbit/sec. When the signal light power is increased over all wavelength channels as shown by curve (b) in FIG. 33, the conventional tried to keep the output signal light from the transmission fiber constant. That is, in the conventional technique, the control decreased the pumping power, so that gain due to Raman amplification is reduced. As a result, the average signal power becomes as shown by curve (c) in FIG. 33. In this example, input signal light is increased by 10 dB. As a result of the increase in the input signal light power, the signal degradation due to nonlinear waveform distortion is increased and the waveform of the output signal light from the transmission fiber becomes as shown by the waveform in FIG. 34b. From this, it is clear that the nonlinear waveform degradation has become large.

In order to suppress such nonlinear waveform distortion, it is necessary to restrict Raman gain such as shown by curve (d) in FIG. 30. In such case, the increase in nonlinear waveform distortion in the preceding part of the transmission fiber cancels out with the decrease in nonlinear waveform distortion in the subsequent part of the transmission fiber and becomes comparable to the amount of nonlinear waveform degradation as in (a) of FIG. 30. In this case, however, since the output signal power from the transmission fiber is lowered, the signal quality is degraded by ASE generated by the subsequent optical amplifier.

In the conventional techniques related to the bidirectional pumping, a control method has not clearly been defined for the case when the input signal light power into an transmission fiber varied while wavelength characteristics thereof is kept constant. If a simple control is performed for the reduction in input signal light power such that gain obtained by the forward pumping and gain obtained by the backward pumping are increased at the same rate, signal quality in the backward pumping portion is degraded due to Raman ASE. On the contrary, when the input signal power is increased, signal quality in the forward pumping portion is degraded due to the additional nonlinear waveform distortion.

JP2000-98433A discloses an output light power control means in which the input or output light is monitored and a pumping light power is controlled on the result of the monitoring such that the output light power is kept at a predetermined value. However, JP2000-98433A does not disclose any control method, which takes the ratio of the forward pumping to the backward pumping and Raman ASE into consideration.

As such, since there is no control technique related to collaboration of the forward pumping and the backward pumping in the conventional optical communication system or an optical amplifier, which utilizes Raman amplification and because there is no optical amplifier, which utilizes Raman amplification that is capable of adapting to various input signal light powers, it has been usual to find the optimal point in try-and-error manner every time when the conventional optical amplifier is installed. Therefore, a huge amount of labor is required in installing the conventional optical amplifier and a cost for sending engineers to the location of the installation, causing such technique to be not realistic.

Further, if the characteristics of transmission line is changed because the configuration of the transmission line is changed such as by an optical cross-connect, it is difficult to flexibly adapt to such situation by the conventional technique.

SUMMARY OF THE INVENTION

The present invention was made in view of such background and has an object to provide a Raman amplification control method capable of suppressing degradation of signal quality caused by variation of input power of signal light injected into a transmission fiber and of being applied to optical fibers having various wavelength dispersion characteristics, an optical communication system using the same control method, an optical amplifier using the same control method and a program for performing the same control method.

In order to achieve the above object, the present invention is featured by injecting at least one signal light into a Raman amplification medium where gain is generated by induced Raman effect, injecting at least one forward pump light and at least one backward pump light into the Raman amplification medium simultaneously to generate the gain given to the signal light by induced Raman effect depending on the intensities of the pump lights, ejecting the signal light from the Raman amplification medium, measuring input power of the signal light and controlling condition of the injection of the pump lights according to a result of the measurement.

Particularly, the control of the injecting condition of pump lights is performed such that, when the input signal light power is decreased, a ratio of the gain given to the signal light by the forward pump light is increased with respect to the gain given to the signal light by the backward pump light and, when the input signal light power is increased, the ratio of the gain obtained by the forward pump light is reduced with respect to the gain obtained by the backward pump light.

It is preferable to perform a control for increasing the total gain obtained by the pump lights simultaneously with the control for changing the ratio of the gains obtained by the pump lights when the input signal light power is decreased and to perform a control for decreasing the total gain obtained by the pump lights simultaneously with the control for changing the ratio of the gains obtained by the pump lights when the input signal light power is increased.

The Raman amplification medium may be an optical fiber having negative dispersion value, an absolute value of which may be 20 ps/nm/km or more.

That is, according to a first aspect of the present invention, a Raman amplification control method comprises, in controlling Raman amplification for producing gain in a Raman amplification medium by induced Raman effect, the steps of injecting at least one signal light to the Raman amplification medium, ejecting the signal light from the Raman amplification medium, injecting pump light to the Raman amplification medium, generating gain given to the signal light depending on the intensity of the pump light in the Raman amplification medium by induced Raman effect, measuring input power of the signal light and controlling the pump light injecting step according to a result of the measuring step.

The pump light injecting step includes the steps of injecting at least one forward pump light propagating in the same direction as the signal light and injecting at least one backward pump light propagating in the opposite direction to the signal light and the controlling step includes the step of controlling a ratio of the gain given to the signal light by the forward pump light to the gain given to the signal light by the backward pump light correspondingly to the result of the measurement.

With this control method, it is possible to suppress degradation of the signal quality, which is caused by variation of input power of the signal light injecting to a transmission fiber. Therefore, it is possible to realize optical amplifier, which uses Raman amplification and can correspond to various input signal powers. Consequently, it is possible to substantially reduce the amount of labor and cost, which are required in newly installing the optical amplifier.

Further, it is possible to realize an optical amplifier using Raman amplification, which is capable of flexibly corresponding to a transmission fiber, whose condition is not uniform and whose characteristics is changed with change of the condition in such as a case where a transmission fiber is used by switching by using an optical cross-connect.

For example, it is possible to reduce degradation of the signal quality due to ASE, Raman ASE or nonlinear waveform degradation by controlling, in the controlling step, the forward pump light and the backward pump light such that ratio of the gain given to the signal light by the forward pump light to the gain given to the signal light by the backward pump light is reduced with increase in the input signal light power injected into the Raman amplification medium.

Alternatively, it is possible to reduce degradation of the signal quality due to ASE, Raman ASE or nonlinear waveform degradation caused by variation of the input signal light power by controlling, in the controlling step, the forward pump light and the backward pump light such that output power of the signal light ejected from the Raman amplification medium becomes constant regardless of the signal light injected to the Raman amplification medium.

Alternatively, it is possible to reduce degradation of the signal quality due to ASE or nonlinear waveform degradation caused by variation of the input signal light power by controlling, in the controlling step, the gain of the signal light obtained by the forward pump light correspondingly to the result of measurement while maintaining gain given to the signal light by the backward pump light at constant.

Alternatively, it is possible to achieve uniform signal quality in all of the wavelength channels of the signal light by generating the pump light having a plurality of wavelengths in the pumping step and, in addition to the control of ratio of the gain given to the signal light by the forward pump light to the gain given to the signal light by the backward pump light according to the result of measurement in the monitoring step, performing a control such that output power of the signal light ejected from the Raman amplification medium becomes uniform for all of the wavelength channels in the controlling step.

According to a second aspect of the present invention, an optical communication system is featured by comprising a Raman amplification medium, a pumping portion for injecting pump light having the intensity depending on which the gain given to signal light is generated by induced Raman effect, a monitor portion for measuring the input signal light power and a control portion for controlling the pumping portion correspondingly to a result of measurement in the monitor portion, wherein the pumping portion includes a forward pumping portion for injecting at least one forward pump light propagating in the same direction as the signal light and a backward pumping portion for injecting at least one backward pump light propagating in the opposite direction to the signal light, the control portion includes means for controlling a ratio of the gain given to the signal light by the forward pump light with respect to gain given to the signal light by the backward pump light according to the result of measurement in the monitor portion, the forward pumping means is provided in a transmitter, the backward pumping means is provided in a receiver and the Raman amplification medium includes an optical fiber as an optical transmission line between the transmitter and the receiver.

The control portion is preferably includes means for controlling the forward and backward pump lights such that ratio of gain given to the signal light by the forward pump light to gain given to the signal light by the backward pump light is decreased with increase in input power of the signal light injected to the Raman amplification medium.

Alternatively, the control portion preferably includes means for controlling the forward and backward pump lights such that output power of the signal light ejected from the Raman amplification medium becomes constant regardless of input power of the signal light injected to the Raman amplification medium or means for controlling gain given to the signal light by the forward pump light while the gain given to the signal light by the backward pump light is kept constant according to the result of measurement in the monitor portion.

Alternatively, the pumping portion preferably includes means for generating a pump light having a plurality of wavelengths and the control portion preferably includes means for controlling ratio of the gain given to the signal light by the backward pump light to the gain given to the signal light by the forward pump light according to the result of measurement in the monitoring portion and means for controlling the pump lights such that output power of the signal light ejected from the Raman amplification medium becomes uniform for the wavelengths.

Further, it is preferable that sign of the dispersion value of the optical fiber is negative in at least a portion of a wavelength range of the signal light and the absolute value of the dispersion value is 20 ps/nm/km or more in at least a portion of the wavelength range of the signal light.

According to a third aspect of the present invention, an optical amplifier is featured by comprising a Raman amplification medium, a pumping portion for injecting pump light having the intensity depend on which the gain of signal light is generated by induced Raman effect in the Raman amplification medium, a monitor portion for measuring the input signal light power, a control portion for controlling the pumping portion according to a result of measurement in the monitor portion, a forward pumping portion for injecting at least one forward pump light propagating in the same direction as the signal light and a backward pumping portion for injecting at least one backward pump light propagating in the opposite direction to the signal light, and the control portion includes means for controlling ratio of the gain given to the signal light by the backward pump light to the gain given to the signal light by the forward pump light according to the result of measurement in the monitor portion.

Alternatively, the optical amplifier may comprise a pumping portion for injecting pump light having the intensity depending on which the gain of signal light is generated by induced Raman effect in a Raman amplification medium, a monitor portion for measuring the input signal light power, a control portion for controlling the pumping portion according to the result of measurement in the monitor portion, a forward pumping portion for injecting at least one forward pump light propagating in the same direction as the signal light and a backward pumping portion for injecting at least one backward pump light propagating in the opposite direction to the signal light, and the control portion includes means for controlling ratio of the gain given to the signal light by the backward pump light to the gain given to the signal light by the forward pump light according to the result of measurement in the monitor portion.

The optical amplifier according to the third aspect of the present invention includes the Raman amplification medium as a constitutional element and the alternative optical amplifier does not include the Raman amplification medium as a constitutional element. For example, the former optical amplifier is suitable for a case where a manufacturer of the optical amplifier prepares all of the constitutional elements including the Raman amplification medium, set them in a casing and forwards the casing. The latter optical amplifier is suitable for a case where a manufacturer prepares the constitutional elements except the Raman amplification medium, set them in a casing and forwards the casing to a certain location in which a Raman amplification medium is already set to connect the casing to the Raman amplification medium.

The control portion preferably includes means for controlling the forward pumping portion and the backward pumping portion such that ratio of the gain given to the signal light by the forward pump light to the gain given to the signal light by the backward pump light is reduced with increase in power of the signal light injected into the Raman amplification medium.

Alternatively, the control portion may include means for controlling the forward and backward pump lights such that output power of signal light ejected from the Raman amplification medium becomes constant regardless of input power of the signal light injected to the Raman amplification medium or means for controlling gain given to the signal light by the forward pump light while the gain given to the signal light by the backward pump light is maintained constant, according to the result of measurement in the monitor portion.

Alternatively, the pumping portion may include means for generating a plurality of pump lights having different wavelengths and the control portion may include means for controlling ratio of the gain given to the signal light by the backward pump light to the gain given to the signal light by the forward pump light according to the result of measurement in the monitor portion and means for controlling the pump lights such that output power of the signal light ejected from the Raman amplification medium becomes uniform for wavelengths thereof.

Further, the Raman amplification medium may include an optical fiber, sign of dispersion value of the optical fiber is negative in at least a portion of a wavelength range of the signal light and an absolute value of the dispersion value is 20 ps/nm/km in at least a portion of the wavelength range of the signal light.

Further, the optical amplifier may include means for allocating wavelengths of the pump lights such that peak wavelength λmin of a shorter peak wavelength and peak wavelength λmax of longer peak wavelength of arbitrary two of the plurality of the pump lights having different wavelengths generated by the forward pump portion and minimum wavelength λshort of the wavelength range of the signal light and maximum wavelength λlong of the wavelength range of the signal light satisfy a relation:

λshort>λmin×λmax/(2λmin−λmax)

or

λmin×λmax/(2λmin−λmax)>λlong

Alternatively, the optical amplifier may include means for allocating wavelengths of the pump lights such that arbitrary three of the plurality of the pump lights having different wavelengths, which have peak wavelengths satisfying the relation λmin<λmid<λmax, and minimum wavelength λshort of the wavelength range of the signal light and maximum wavelength λlong of the wavelength range of the signal light satisfy a relation:

λshort>λmax×λmid×λmin/(λmid×λmin−λmax×
λmid+λmax×λmin)

or

λmax×λmid×λmin/(λmid×λmin−λmax×λmid+λmax×
λmin)>λlong

Alternatively, the optical amplifier may include means for arranging or setting wavelengths of the pump lights or powers of the pump lights or both of the wavelengths and the powers such that power of light waves generated by non-linear effect occurring between pump lights generated by the forward pumping portion and/or between pump light and input optical signal becomes smaller than power of the signal light by 20 dB, that is, one hundredth or smaller, at any point of the Raman amplification medium within the wavelength range of the signal light. For example, the nonlinear effect results from Four-Wave Mixing (FWM).

In this case, the Raman amplification medium may include an optical fiber whose absolute value of wavelength dispersion can be in a range from 2 ps/nm/km to 10 ps/nm/km in at least a portion of the wavelength range of the signal light.

Alternatively, the Raman amplification medium may include an optical fiber whose zero dispersion wavelength can be in a range from peak wavelength of a pump light among the pump lights, which has a minimum peak wavelength, to peak wavelength of a pump light having a maximum peak wavelength.

By allocating wavelengths of the pump lights such that wavelengths of light waves generated by nonlinearity effect between pump lights and/or between pump light and input signal light do not included in the wavelength range of the input signal light or by suppressing degradation of the signal light due to light waves generated by nonlinearity effect between pump lights and/or between pump light and input signal light, the optical amplifier of the present invention can be applied to optical fibers having various wavelength dispersion characteristics. Further, by applying the allocation of wavelengths of the pump lights to the optical communication system, the optical communication system of the present invention can be applied to various optical fibers.

According to a fourth aspect of the present invention, a program for making an information processing device possible to realize a function of controlling ratio of the gain given to signal light by backward pump light to the gain given to the signal light by forward pump light according to a result of measurement of input power of the signal light as a control function of an injection control of the forward and backward pump lights in an optical communication system or an optical amplifier in which the program is installed and which performs the forward pumping by injecting at least one forward pump light propagating in the same direction as the signal light and the backward pumping by injecting at least one backward pump light propagating in opposite direction to the signal light, by injecting the pump lights generating gains of the signal light by induced Raman effect depending on the intensities thereof, measuring input power of the signal light and controlling injection of the pump lights according to the result of the measurement.

As the control function, it is preferable to realize a function of controlling the forward and backward pump lights such that ratio of the gain given to the signal light by the forward pumping to the gain given to the signal light by the backward pumping is decreased with increase in the input signal light power injected into the Raman amplification medium.

Alternatively, as the control function, it is preferable to realize a function of controlling the forward and backward pump lights such that output power of the signal light ejected from the Raman amplification medium becomes constant regardless of input power of the signal light injected into the Raman amplification medium.

Alternatively, as the control function in a case where a plurality of pump lights having different wavelengths, it is preferable to realize a function of controlling ratio of the gain given to the signal light by the backward pump light to the gain given to the signal light by the forward pump light according to the result of the measurement and a function of controlling the pump lights such that output power of the signal light ejected from the Raman amplification medium becomes uniform for wavelengths.

Alternatively, as the control function, it is preferable to realize a function of controlling the gain given to the signal light by the forward pump light while keeping the gain given to the signal light by the backward pump light at constant.

The program of the present invention can be installed in the information processing equipment by using a recording medium in which the program is recorded. Alternatively, it is possible to install the program of the present invention directly to the information processing equipment from a server having the program of the present invention through a network.

Therefore, it is possible to realize an optical communication system and an optical amplifier capable of suppressing degradation of signal quality due to variation of input signal light power injected into a transmission fiber by the information processing equipment such as computer.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Optical communication systems according to preferred embodiments of the present invention will be described with reference to FIG. 1, FIG. 4, FIG. 6, FIG. 7 and FIG. 12.

The optical communication system of the present invention basically comprises an optical fiber 1 as Raman amplification medium, a pumping portion 2 for injecting pump lights generating gains given to signal light depending on the intensities thereof by induced Raman effect to the optical fiber 1, a monitor portion for measuring input signal light 5 injected to the optical fiber 1, a pumping portion 2 including a forward pumping portion for injecting forward pump light propagating in the same direction as the input signal light 5 to the optical fiber 1 and a backward pumping portion for injecting backward pump light propagating in the opposite direction to the signal light 5 to the optical fiber 1, a control portion for controlling the pumping portion 2 according to a result of measurement in the monitor portion and WDM couplers 8*a* and 8*b* for guiding the forward and backward pump lights to the optical fiber 1, respectively.

Figure 1:
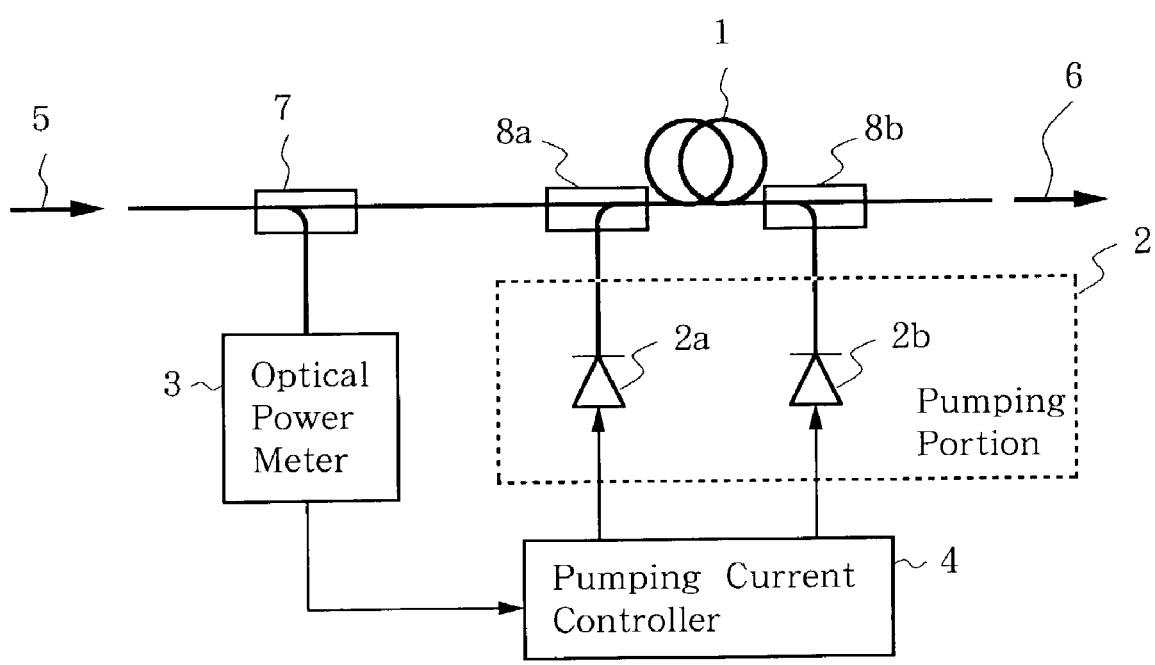
FIG. 1 is a block diagram showing a construction of an optical communication and an optical amplifier according to a first embodiment of the present invention.

In the case shown in FIG. 1, the monitor portion comprises an optical power meter 3 and the forward pumping portion includes a pumping laser diode (LD) 2*a* and the backward pumping portion includes a pumping LD 2*b*.

Figure 4:
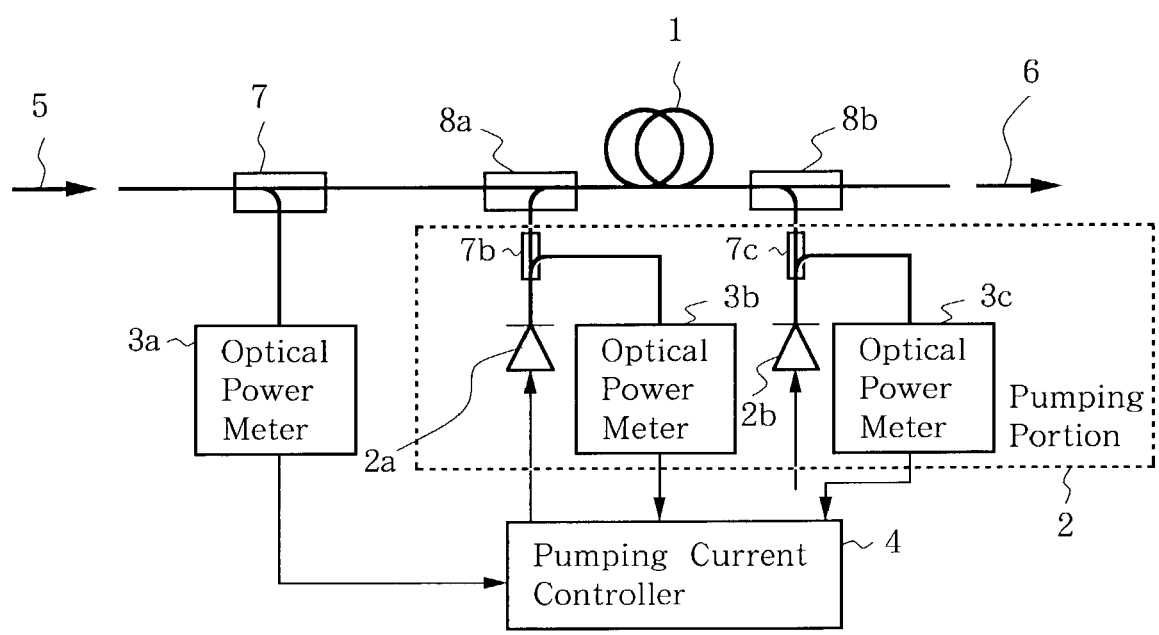
FIG. 4 is a block diagram showing a construction of an optical communication system and an optical amplifier according to a second embodiment of the present invention.

In FIG. 4, the monitor portion includes an optical power meter 3*a* similar to the optical power meter 3 in FIG. 1 and the pumping portion 2 includes, in addition to the pumping LDs 2*a* and 2*b*, optical power meters 3*b* and 3*c* for measuring powers of the forward and backward pump lights, respectively.

Figure 6:
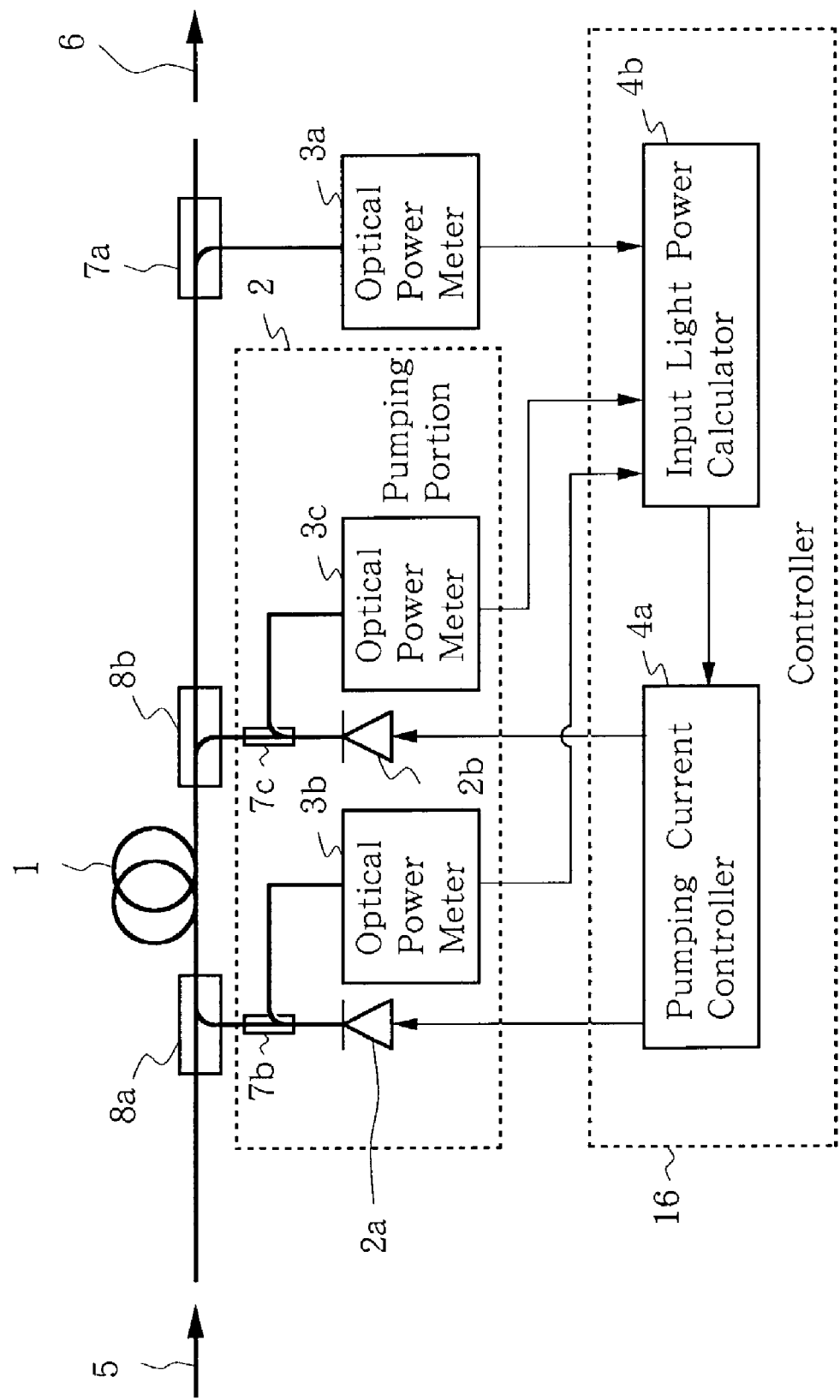
FIG. 6 is a block diagram showing a construction of an optical communication system and an optical amplifier according to a fourth embodiment of the present invention.

An embodiment shown in FIG. 6 differs from that shown in FIG. 4 in that an optical power meter 3*a* for measuring power of an output signal light 6 is provided and the control portion includes a pumping current controller 4*a* and an input light power calculator 4*b*.

Figure 7:
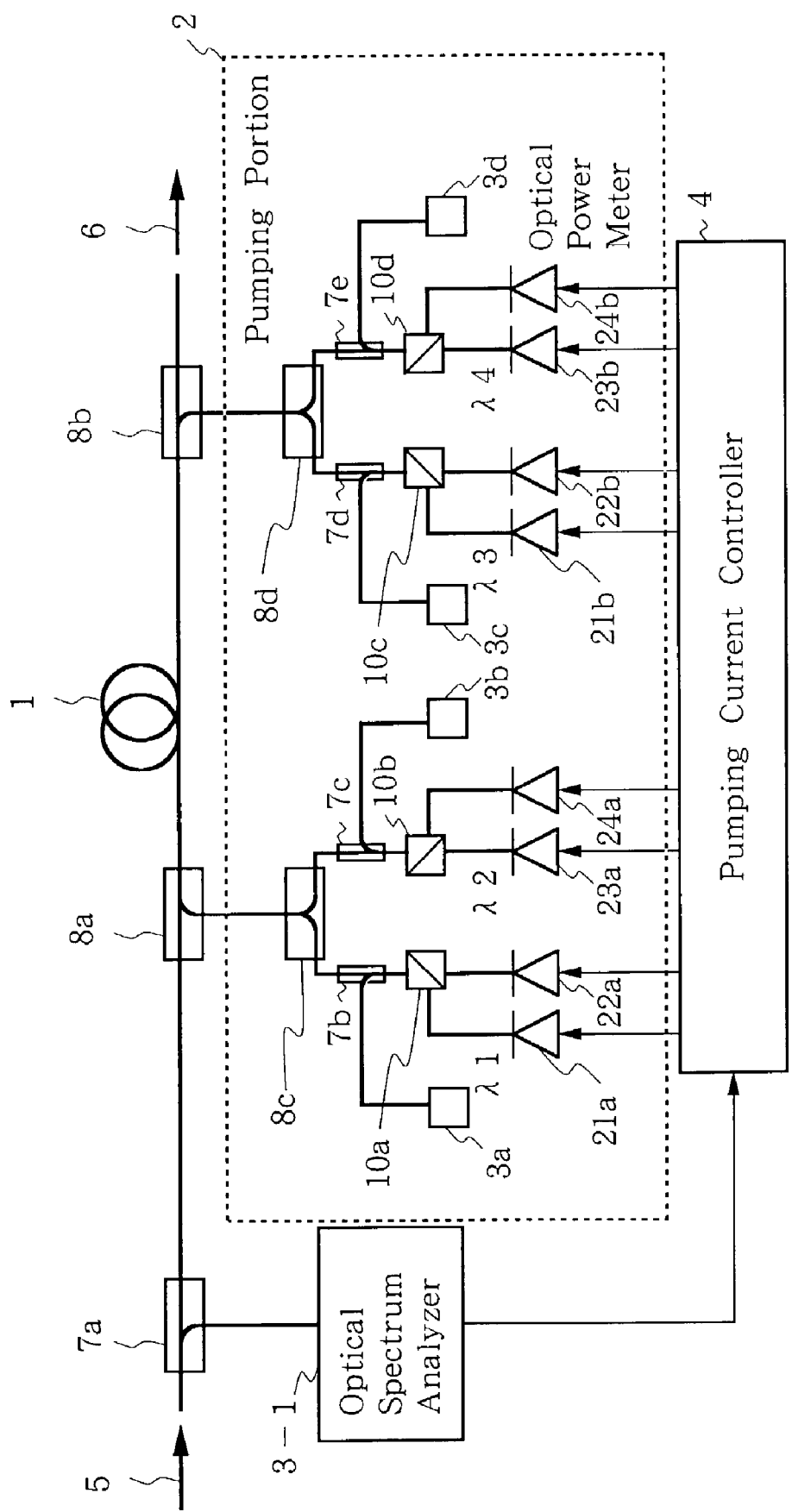
FIG. 7 is a block diagram showing a construction of an optical communication system and an optical amplifier according to a fifth embodiment of the present invention.

In the embodiment shown in FIG. 7, the monitor portion comprises an optical spectrum analyzer 3-1, the forward pumping portion of the pumping portion 2 includes a plurality of pumping LDs (21*a*, 22*a*, 23*a* and 24*a*) emitting lights having different wavelengths, optical power meters 3*a* and 3*b* for measuring powers of thereof and a WDM coupler 8*c* and the backward pumping portion thereof includes a plurality of pumping LDs (21*b*, 22*b*, 23*b* and 24*b*) emitting lights having different wavelengths, optical power meters 3*c* and 3*d* for measuring powers of thereof and a WDM coupler 8*d*.

Figure 12:
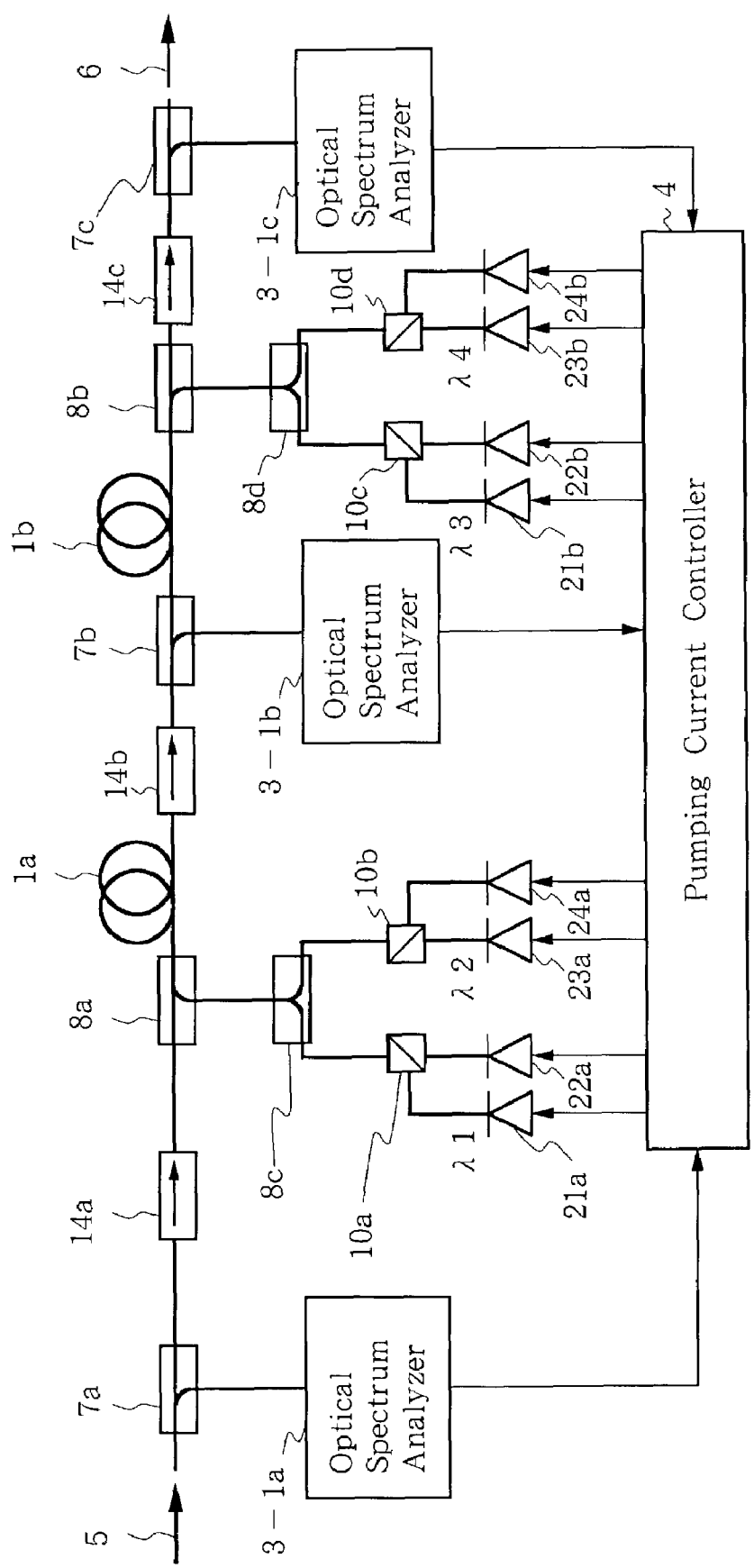
FIG. 12 is a block diagram showing a construction of an optical communication system and an optical amplifier according to a seventh embodiment of the present invention.

The embodiment shown in FIG. 12 differs from that shown in FIG. 7 in that series-connected wavelength dispersion compensation optical fibers 1*a* and 1*b* are provided as the Raman amplification medium, the three monitor portions 3-1*a*, 3-1*b* and 3-1*c* for measuring powers of the input signal light, signal light between the dispersion compensation fibers 1*a* and 1*b* and the output signal light, respectively.

In any of these embodiments, the forward pumping portion of the pumping portion 2 is provided in a transmitter and the backward pumping portion thereof is provided in a receiver and the Raman amplification medium connects the transmitter to the receiver as an transmission fiber.

These embodiments will be described in more detail. In the first and second embodiments shown in FIG. 1 and FIG. 2, respectively, the pumping current controller 4 measures power of an input signal light 5 by means of the optical power meter 3 (or 3*a*) and controls the forward and backward pump lights such that ratio of gain given to the signal light by the LD 2a to gain given to the signal light by the LD 2b is decreased with increase in the input signal light 5.

In the fourth embodiments shown in FIG. 6, power of an output signal light ejected from the optical fiber 1 is measured by the optical power meter 3a and the pumping current controller 4a controls the forward and backward pump lights such that the power thereof becomes constant regardless of the input signal light power injected to the optical fiber 1.

In the fifth embodiment shown in FIG. 7, the pumping portion 2 includes a plurality of pumping LDs 21a to 24a and 21b to 24b for generating a plurality of pump lights having different wavelengths and the pumping current controller 4 controls ratio of gain given to the signal light 6 by the pump lights injected by the pumping LD 21b to 24b to gain given to the signal light 5 by the pump lights injected by the pumping LDs 21a to 24a according to the result of measurement by the optical spectrum analyzer 3-1 and controls the pump lights such that power of the signal light 6 ejected from the optical fiber 1 becomes uniform for the wavelengths.

In the seventh embodiment shown in FIG. 12, the pumping current controller 4 controls gain of the signal light obtained by the pumping lights injected by the pumping LDs 21a to 24a according to the result of measurement in the optical spectrum analyzer 3-1a while keeping gain of the optical signal light obtained by the pump lights injected by the pump lights injected by the pumping LDs 21b to 24b and measured by the optical spectrum analyzers 3-1b and 3-1c constant. Sign of the dispersion value of the optical fiber 1 is minus in at least a portion of the wavelength range of the signal light and an absolute value of the dispersion value is 20 ps/nm/km or more in at least a portion of the wavelength range of the signal light.

In the optical communication system of the present invention, the pumping LDs 2a, 21a to 24a and the WDM coupler 8a are provided in the transmitter and the pumping LDs 2b, 21b to 24b and the WDM coupler 8b are provided in the receiver. The optical fiber 1 forms an optical transmission line between the transmitter and the receiver. By housing the pumping LDs 2a, 21a to 24a, the WDM coupler 8a, the pumping LDs 2b, 21b to 24b, the WDM coupler 8b and the optical fiber 1 in a casing, an optical amplifier using Raman amplification is realized.

The pumping current controllers 4 and 4a or the input light power calculator 4b used in the optical communication system or the optical amplifier of the present invention can be realized by a computer as the information processing device. That is, by installing a program by which a function of controlling ratio of gain given to the signal light by the pump lights injected by the pumping LDs 2a, 21b to 24b to gain given to the signal light by the pump lights injected by the pumping LDs 2a, 21a to 24a correspondingly to the result of measurement of the optical power meters 3, 3a and 3d or the optical spectrum analyzers 3-1, 3-1a to 3-1c in the computer device, as a function corresponding to the pumping current controllers 4 and 4a or the input light power calculator 4b of the optical communication system or the optical amplifier of the present invention, it is possible to realize the function corresponding to the pumping current controllers 4 and 4a or the input light power calculator 4b by using the computer device.

As the function corresponding to the pumping current control 4 according to the first or second embodiment shown in FIG. 1 or FIG. 4, the program of the present invention makes the computer device possible to realize the function of controlling the forward and backward pump lights such that ratio of gain obtained by the pumping LD 2a is decreased with respect to the gain obtained by the pumping LD 2b with increase in input signal light 5.

As the function corresponding to the pumping current controller 4a according to the fourth embodiment shown in FIG. 6, the program of the present invention makes the computer device possible to realize a function of controlling the forward and backward pump lights such that power of the output signal light 6 from the optical fiber 1 becomes constant regardless of input signal light 5 injected to the optical fiber 1.

Further, in the fifth embodiment shown in FIG. 7, the pumping portion 2 includes the pumping LDs 21a to 24a and 21b to 24b emitting a plurality of pump lights having different wavelengths and the program of the present invention makes the computer device possible to realize, as a function corresponding to the pumping current controller 4, a function of controlling ratio of gain given to the signal light by the pump lights injected by the pumping LDs 21b to 24b to gain given to the signal light by the pumping LDs 21a to 24a according to the result of measurement by the optical spectrum analyzer 3-1 and a function of controlling the pump lights such that power of the output signal light 6 from the pumping LDs 21b to 24b becomes uniform for the wavelengths thereof.

Alternatively, as the function corresponding to the pumping current controller 4 according to the seventh embodiment shown in FIG. 12, the program of the present invention makes the computer device possible to realize a function of controlling gain given to the signal light by the pump lights injected by the pumping LDs 21a to 24a according to the result of measurement by the optical spectrum analyzer 3-1a while keeping gain given to the signal light by the pump lights injected by the pumping LDs 21b to 24b measured by the optical analyzers 3-1b and 3-1c constant.

By recording the program of the present invention in a recording medium, the computer device can be installed with the present program by using the same recording medium. Alternatively, the computer device can be directly installed with the present program from a server holding the present program through a network.

Thus, it is possible to realize an optical communication system and an optical amplifier, which can suppress degradation of signal quality caused by variation of power of the signal light injected to a transmission fiber by means of a computer device.

The embodiments of the present invention will be described in more detail.

First Embodiment

The optical communication system and the optical amplifier according to the first embodiment of the present invention will be described with reference to FIG. 1. In the first embodiment, the optical fiber 1 corresponds to the Raman amplification medium, the pumping LDs 2a and 2b correspond to the forward pumping portion and the backward pumping portion, respectively, the optical power meter 3 corresponds to the monitor portion and the pumping current controller 4 corresponds to the control portion. The input optical signal 5 is branched by the coupler 7 and a substantial portion of the input optical signal is incident on the optical fiber 1 through the WDM coupler 8a and a portion of the input signal is incident on the optical power meter 3.

The input signal light 5 may be WDM signal light. The optical input signal light 5 is measured by the optical power meter 3 and a result of measurement is sent to the pumping current controller 4. The pumping current controller 4 controls the pumping currents of the pumping LDs 2a and 2b according to the measured input signal light 5. The pumping LDs 2a and 2b emit pump lights corresponding to the pumping currents thereof, respectively. The pump lights from the pumping LDs are injected to the optical fiber 1 through the WDM couplers 8a and 8b in the signal light direction and the opposite direction, respectively. The pump lights produce gains in the optical fiber 1 by induced Raman effect depending on their intensities. The signal light to which the gains are given passes through the optical coupler 8b and is ejected as the output signal light 6.

Figure 2:
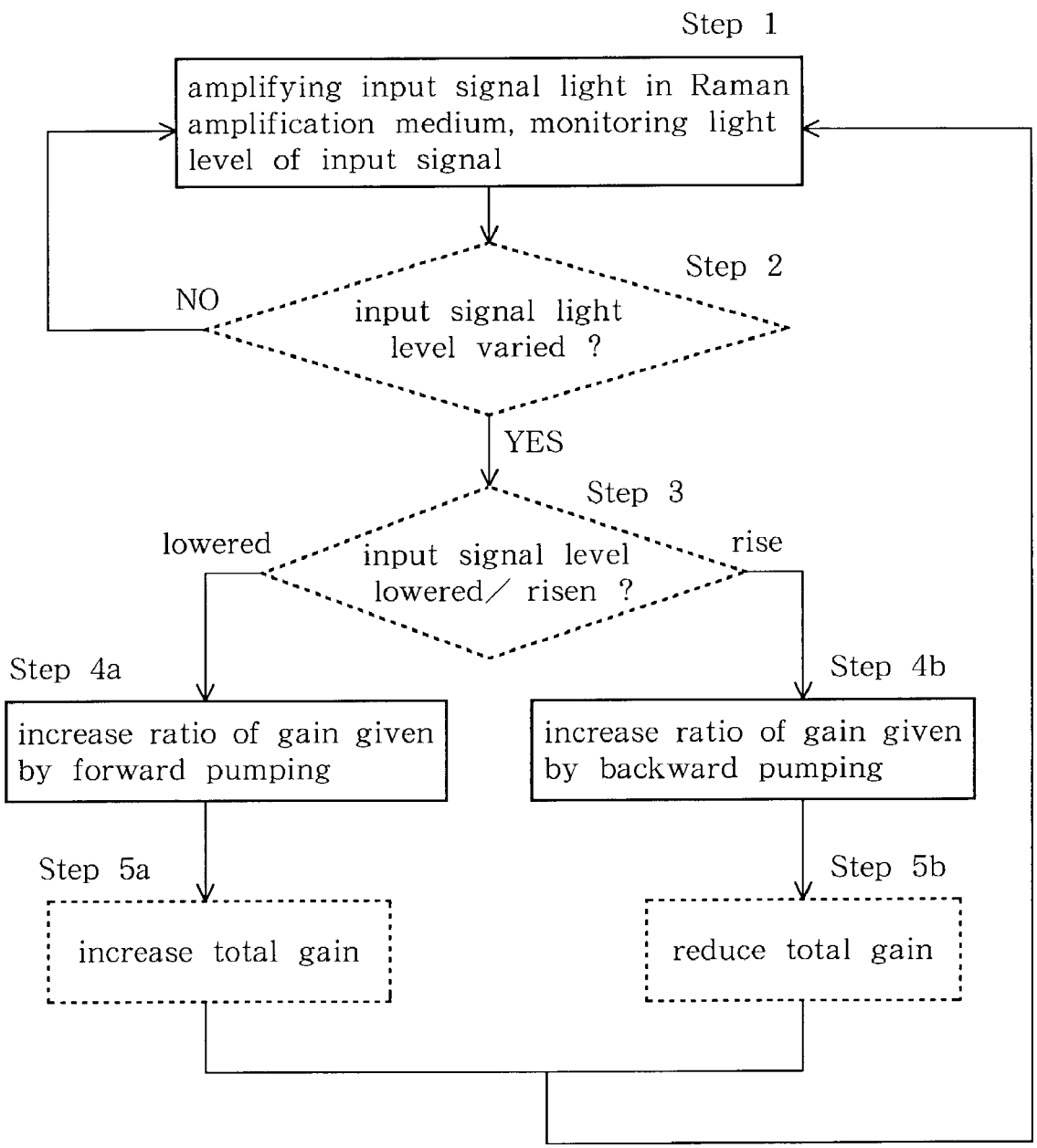
FIG. 2 is a flowchart showing an operation of a pumping current controller shown in FIG. 1.

The control method in the first embodiment will be described with reference to a flowchart shown in FIG. 2. First, in the state in which the signal light is amplified by gains obtained by the pump lights emitted from the pumping LDs 2a and 2b and input signal light 5 is monitored by the optical power meter 3 (Step 1), it is assumed that variation of input signal light 5 is detected by the optical power meter 3 (Step 2).

When the detected power variation of the input signal light 5 indicates a reduction of power (Step 3), the pumping current controller 4 performs a pumping current control such that ratio of gain given to the signal light by the forward pump light from the pumping LD 2a to gain given to the signal light by the backward pump light from the pumping LD 2b increases. (Step 4a).

In more detail, a table storing pumping current values for respective input signal powers is preliminarily provided in the pumping current controller 4 and pumping currents corresponding to pumping current values for the input signal light obtained by searching the table are supplied to the pumping LDs 2a and 2b. As a result of such current control, ratio of gain by the forward pumping is increased, so that degradation due to Raman ASE generated by the backward pumping is suppressed.

On the other hand, when the detected power variation of the input signal light 5 indicates an increase in power (Step 3), the pumping current controller 4 performs a pumping current control such that ratio of gain given to the signal light by the forward pump light from the pumping LD 2a to gain given to the signal light by the backward pump light from the pumping LD 2b decreases. (Step 4b). As a result of such current control, degradation due to additional nonlinear waveform degradation by the forward pumping is suppressed.

The pumping current values for respective input signal powers preliminarily stored in the pumping current controller 4 are set such that ratio of gain by one of the two pump lights to that by the other can be changed appropriately and power of the output signal light 6 becomes constant regardless of the input signal light.

The optical power meter 3 used in the first embodiment may be a photo diode, which is known as a conventional element for measuring a total power of the whole signal light or an optical spectrum analyzer, which is known as a conventional element capable of measuring signal light powers in respective wavelength channels separately.

In the first embodiment and other embodiments to be described later, a portion or whole portion of parts constituting the pumping portion 2, the pumping current controllers 4 and 4a and the input light power calculator 4b may be arranged in locations mutually separated physically. Particularly, the forward pumping means such as the pumping LD 2a and the backward pumping means such as the pumping LD 2b may be arranged separately in locations, distance between which may be several tens km. In such case, it is possible to construct an optical communication system having a transmitter equipped with the pumping LD 2a and a receiver equipped with the pumping LD 2b. On the other hand, it is possible to construct an optical amplifier using Raman amplification by arranging all parts constituting the pumping portion 2, the pumping current controllers 4 and 4a and the input light power calculator 4b in a casing.

Figure 3:
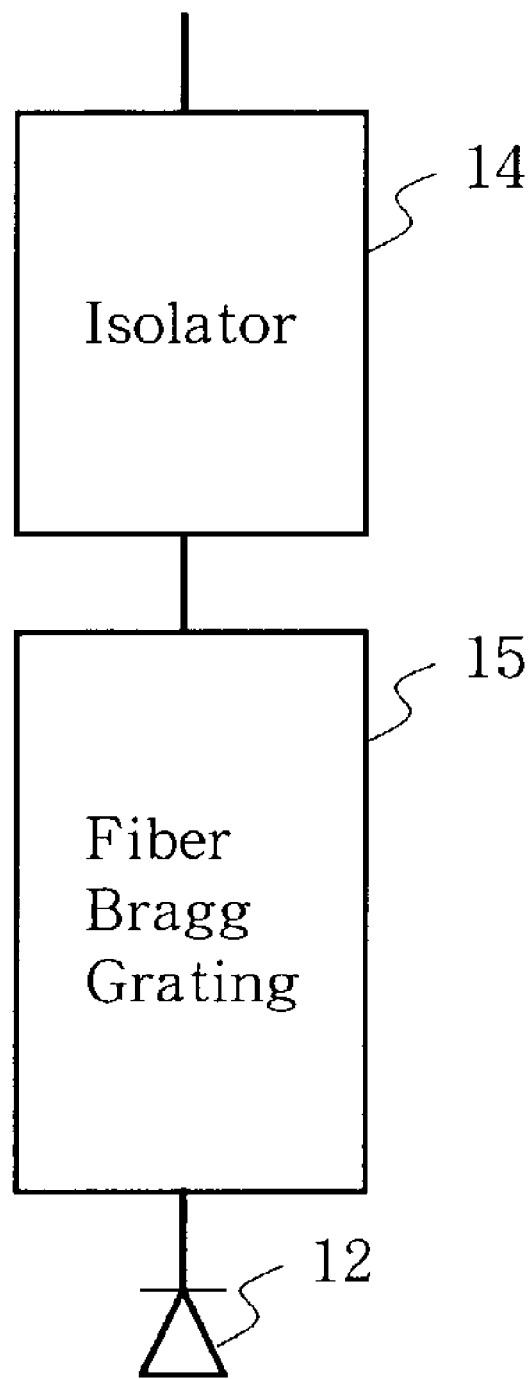
FIG. 3 is a block diagram showing a preferred construction of a pumping LD shown in FIG. 1.

As the pumping LD, a semiconductor LD having a fiber Bragg grating as an external resonator is used. When the LD having such construction is used, it is impossible to arrange an isolator constituting the external resonator between the fiber Bragg grating 15 and the LD element 12, as shown in FIG. 3. Therefore, the isolator 14 is connected separately. This is also true in the embodiments to be described later. Since power of pump light ejected from the pumping LD is stabilized with time by inserting the isolator, it is possible to stabilize gain obtained thereby.

Second Embodiment

An optical communication system and an optical amplifier according to a second embodiment of the present invention will be described with reference to FIG. 4. In the second embodiment, portions of the pump lights emitted from pumping LDs 2a and 2b are ejected by couplers 7b and 7c and inputted to power meters 3b and 3c, respectively.

Although, in the first embodiment, the pumping current controller 4 preliminarily stores the pumping current values for input signal light powers, the pumping current controller in the second embodiment preliminarily stores aimed values of pumping light powers. In the second embodiment, the pumping current controller 4 controls the pumping currents of the pumping LDs such that power values of the forward pump light and the backward pump light detected by the optical power meters 3b and 3c become coincident with the aimed values of the pumping light powers.

Incidentally, the aimed values of the stored pumping light powers are rewritten to optimal values once at starting time of the system, periodically or always by measuring characteristics of the optical fiber.

The aimed value of the pumping light power is set to a power value with which ratio of gain given to the signal light by the forward pump light emitted from the pumping LD 2a to gain given to the signal light by the backward pump light emitted from the pumping LD 2b increases with decrease of input signal light 5.

Alternatively, the aimed value of the pumping power is set to a value with which the ratio of the gains given by the pump lights is appropriately changed and power of the output signal light 6 becomes constant regardless of input signal light 5.

By storing the aimed values of the pumping light power in lieu of the pumping currents for the respective input signal powers in the pumping current controller 4 as in the second embodiment, it is possible to achieve a desired gain ratio even if the pumping current of the pumping LD vs. output pumping light power characteristics is changed by secular change.

Third Embodiment

Figure 5:
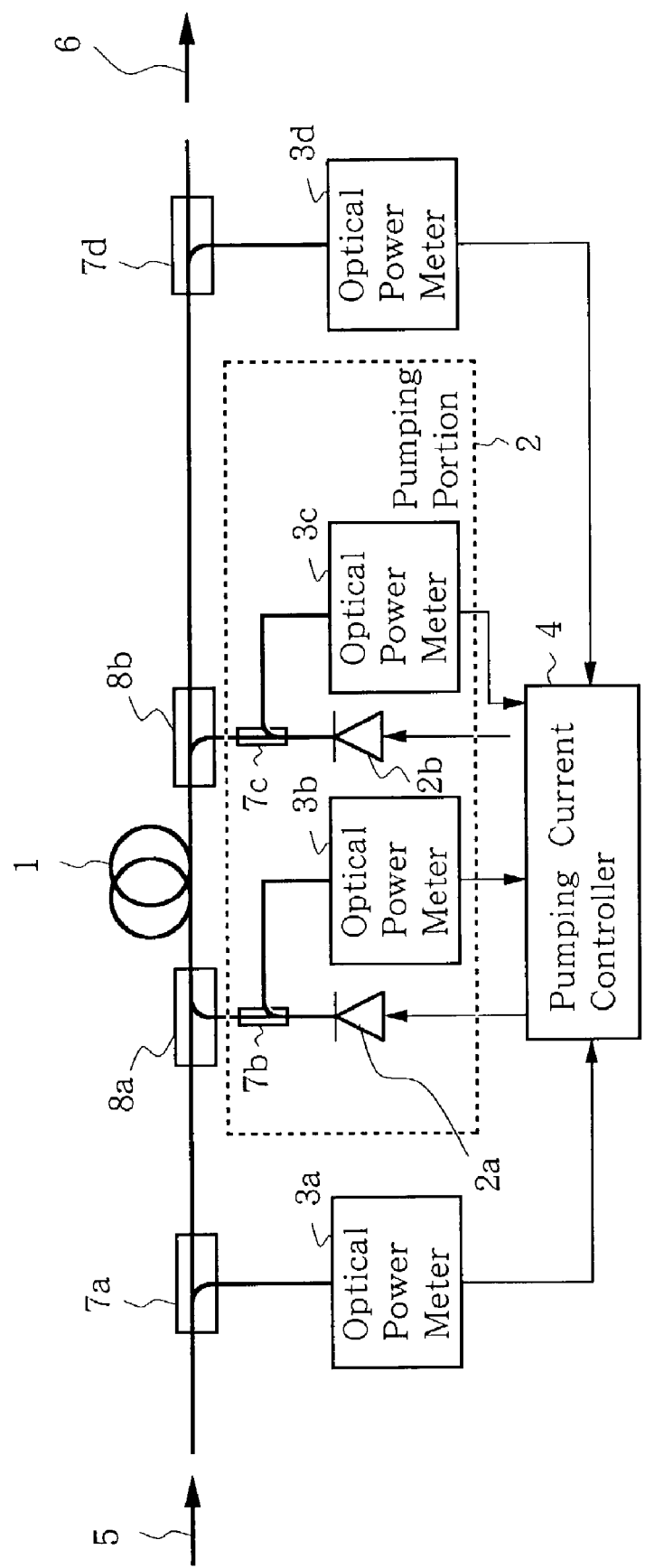
FIG. 5 is a block diagram showing a construction of an optical communication system and an optical amplifier according to a third embodiment of the present invention.

An optical communication system and an optical amplifier according to a third embodiment of the present invention will be described with reference to FIG. 5. In the third embodiment, an optical fiber 1 corresponds to the Raman amplification medium, a pumping LD 2a, a coupler 7b and an optical power meter 3b correspond to the forward pumping portion, a pumping LD 2b, a coupler 7c and an optical power meter 3c correspond to the backward pumping portion, optical power meters 3a and 3b correspond to the monitor portion and a pumping current controller 4 corresponds to the control portion. In the third embodiment, the optical power meter 3a measures input signal light and the optical power meter 3d measures power of the output signal light 6.

First, the pumping current controller 4 sets powers of the pump lights emitted from the pumping LDs 2a and 2b to the preliminarily stored aimed values correspondingly to input signal light 5 and then controls the pumping currents of the pumping LDs 2a and 2b such that the set values reach predetermined values correspondingly to a value of the output signal light 6 measured by the optical power meter 3d.

In more detail, the control corresponding to the power value of the output signal light 6 is performed by varying a total pumping power while keeping ratio of optical powers ejected from the both pumping LDs at constant or performed for either one of the forward and backward pump lights.

In lieu of the preliminary storage of aimed values of powers of the both pump lights with respect to the respective input signal powers, it is possible to store only ratio of powers of the pump lights. In such case, the pumping control is performed by controlling pumping currents such that power of the output signal light 6 measured by the optical power meter 3d is kept at a ratio preliminarily set while keeping the power ratio of the both pumping LDs measured by the optical power meters 3b and 3c at constant.

According to the third embodiment, even if a value with which the power of the output signal light 6 becomes constant is set as an preliminarily set aimed value of the pumping power, there may be a case where practically obtainable power of the output signal light 6 is deviated from a desired value due to difference in loss between transmission line fibers. In the third embodiment, since power of the output signal light 6 is monitored, it becomes possible to make the power of the output signal light 6 close to the desired value in more reliably.

Fourth Embodiment

An optical communication system and an optical amplifier according to a fourth embodiment of the present invention will be described with reference to FIG. 6. In the fourth embodiment, an optical fiber 1 corresponds to the Raman amplification medium, a pumping LD 2a, a coupler 7b and an optical power meter 3b correspond to the forward pumping portion, a pumping LD 2b, a coupler 7c and an optical meter 3c correspond to the backward pumping portion, an optical power meter 3a corresponds to the monitor portion and an input light power calculator 4b and a pumping current controller 4a correspond to the control portion.

In the fourth embodiment, power of the input signal 5 is estimated from a calculation performed by the input light power calculator 4b on the basis of a result of measurement of power of the output signal light 6 by the optical power meter 3a arranged behind the optical fiber 1 and a result of measurement of power of the pump lights from the pumping LDs 2a and 2b by the power meters 3b and 3c. Ratio of powers of the forward and backward pump lights with respect to powers of the respective input signal light 5 is preliminarily stored in the control portion 16 and the control is performed on the basis of this power ratio.

In more detail, input signal light 5 is estimated by calculation performed on the basis of power of the output signal light 6 measured by the optical power meter 3a and powers of the pump lights from the pumping LDs 2a and 2b measured by the optical power meters 3a and 3c. Ratio of the forward and backward pumping light powers preliminarily stored in the control portion 16 correspondingly to powers of the input signal light 5 is compared with ratio of light powers of the pumping LDs 2a and 2b measured by the optical power meters 3b and 3c and, when the two ratios are different from each other by a constant amount or more, the pumping current control is performed for the pumping LDs 2a and 2b.

For example, when the ratio of the forward pumping light power ejected from the pumping LD 2a is higher than the stored ratio, the pumping current control is performed to lower the light power of the pumping LD 2a while keeping the total pump light from the pumping LDs 2a and 2b constant optical (or to increase the light power of the pumping LD 2b by the same amount).

In addition to the above mentioned control, in the fourth embodiment, a control is performed to make the output signal light power measured by the optical power meter 3a coincident with a certain set value. In order to do so, after an appropriate light power ratio of the pump lights with respect to the estimated input signal light power is achieved by the above mentioned control, it is enough to perform the pumping current control by changing the total pumping power while keeping the ratio such that the desired power of the output signal light 6 is obtained.

In the fourth embodiment, since the optical power meter for monitoring input signal light 5 and the coupler for branching the signal light to the optical power meter of the third embodiment can be removed, it is possible to make the system construction simple.

Fifth Embodiment

An optical communication system and an optical amplifier according to a fifth embodiment of the present invention will be described with reference to FIG. 7. In the fifth embodiment, an optical fiber 1 corresponds the Raman amplification medium, pumping LDs 21a to 24a, a WDM coupler 8c, PBSs (Polarization Beam Splitters) 10a and 10b, couplers 7a and 7c and optical power meters 3a and 3b correspond to the forward pumping portion, pumping LDs 21b to 24b, a WDM coupler 8d, PBSs 10c and 10d, couplers 7d and 7e and optical power meters 3a and 3d correspond to the backward pumping portion, an optical spectrum analyzer 3-1 corresponds to the monitor portion and a pumping current controller 4 corresponds to the control portion.

In the fifth embodiment, the pump lights from the pumping LDs 21a and 22a are polarized and multiplexed by the PBS 10a, the pump lights from the pumping LDs 23a and 24a are polarized and multiplexed by the PBS 10b, the polarized and multiplexed pump lights are further wavelength multiplexed by the WDM coupler 8c and injected through the WDM coupler 8a into the optical fiber 1 in the same direction as that of the signal light. Further, the pump lights from the pumping LDs 21b and 22b are polarized and multiplexed by the PBS 10c, the pump lights from the pumping LDs 23b and 24b are polarized and multiplexed by the PBS 10d, the polarized and multiplexed pump lights are further wavelength multiplexed by the WDM coupler 8d and injected through the WDM coupler 8b into the optical fiber 1 in the opposite direction to that of the signal light.

Incidentally, wavelengths of the pump lights from the pumping LDs 21a to 24a and 21b to 24b may be different or may be partially different. In the example shown in the figure, wavelength of the pump lights from the pumping LDs 21a and 22a are λ1, wavelength of the pump lights from the pumping LDs 23a and 24a are λ2, wavelength of the pump lights from the pumping LDs 21b and 22b are λ3 and wavelength of the pump lights from the pumping LDs 23b and 24b are λ4.

In the construction of the fifth embodiment, the signal light powers of the respective wavelength channels are measured by the optical spectrum analyzer 3-1 and ratio of gain due to the forward pump light to gain due to the backward pump light is controlled according to a result of the measurement.

A more detailed example of the control will be descried. First, the signal light powers of the respective wavelength channels are measured by the optical spectrum analyzer 3-1. The pumping current controller 4 controls the pump lights from the pumping LDs 21a to 24a and 21b to 24b by using the tilting of input signal light power with respect to wavelength and the aimed values of the pumping light powers preliminarily stored in the pumping current controller 4 with respect to a total input signal power. Whether or not the aimed pumping power is achieved is determined by using the measured values of the optical power meters 3a to 3d.

The aimed value of pumping light power stored in the pumping current controller 4 is set such that power of the pump light on the short wavelength side is increased with decrease of the input signal light on the short wavelength side, that is, with increase in tilting degree on the short wavelength side. Further, the aimed value is set such that ratio of average gain (average value of gains for respective wavelength channels) due to forward pump lights to average gain due to the backward pump lights is decreased with increase in the total input signal power.

In the fifth embodiment, by controlling the pumping power according to the aimed value in this manner, it is possible to suppress degradation due to variation of input signal light 5 and, simultaneously, to keep power of the output signal light 6 uniform for wavelengths thereof. By keeping power of the signal light uniform for wavelengths thereof, it becomes possible to provide uniform signal quality for all of the channels.

The aimed values of pumping power stored in the pumping current controller 4 are set to values with which powers of the output signal light 6 becomes uniform for wavelengths thereof and, simultaneously, a total power of the output signal light 6 is maintained constant regardless of powers of the input signal light 5.

Figure 8:
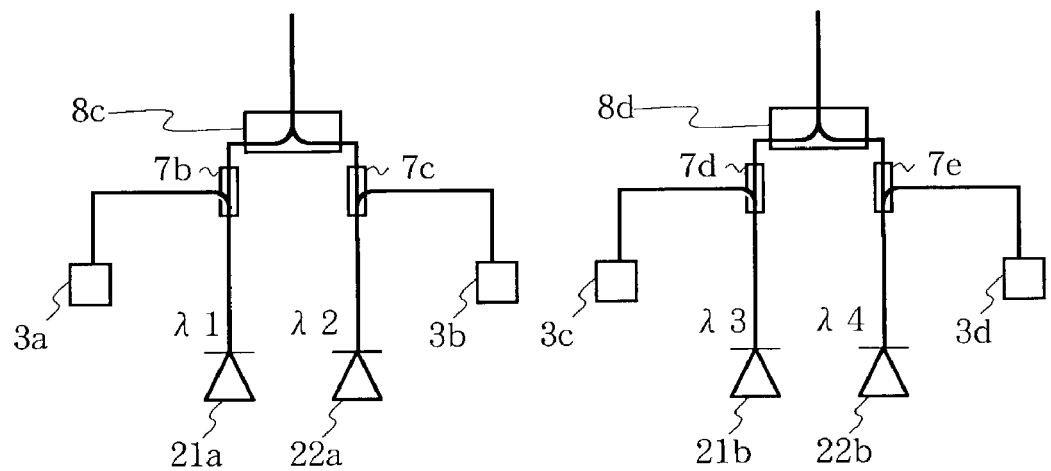
FIG. 8 is a block diagram showing a modification of the pumping portion shown in FIG. 7.
Figure 9:
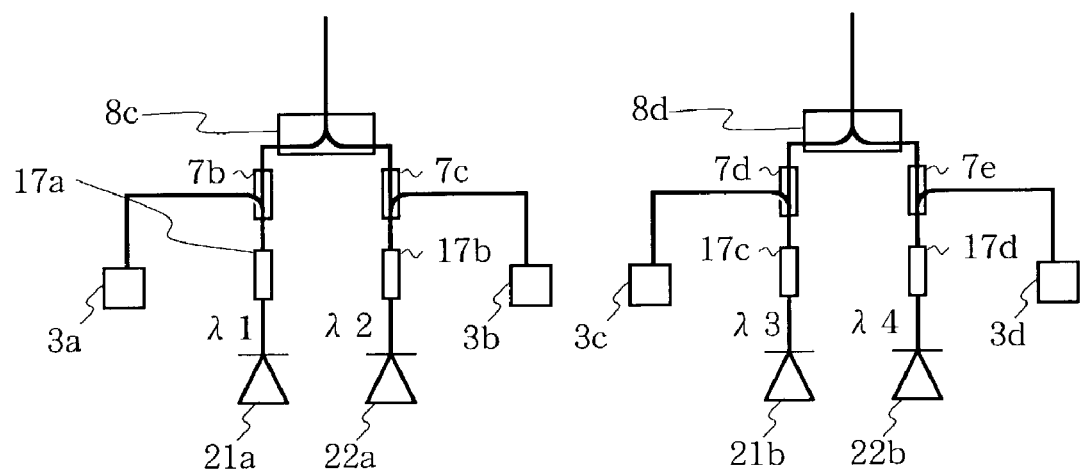
FIG. 9 is a block diagram showing another modification of the pumping portion shown in FIG. 7.

Incidentally, the PBSs 10a to 10d are inserted in order to reduce the polarization dependency of gain of Raman amplification. Therefore, these elements can be removed when there is no polarization dependency problem. For example, the pumping portion may be constructed with LDs the number of which is a half of the number of LDs when there is the PBS, as shown in FIG. 8. Alternatively, in lieu of a combination of one of the paired pumping LDs 21a and 22a, 23a and 24a, 21b and 22b or 23b and 23d and one of the PBSs 10a to 10d, the pumping portion may be constructed with one of conventional depolarizers 17a to 17d for reducing the degree of polarization of the pump light and one of the LDs 21a, 22a, 21b and 22b, as shown in FIG. 9. Alternatively, the pumping portion may be constructed with a group of two pumping LDs and one PBS and another group including one depolarizer and one pumping LD.

Further, in the fifth embodiment, although each of the forward pump light and the backward pump light is constructed with two wavelengths, it may be constructed with three or more wavelengths. In such case, the number of input ports of the WDM coupler 8c or 8d may becomes three or more on demand. The number of wavelengths of the forward pump light is not always coincident with that of the backward pump light.

Further, it is possible to add a construction for monitoring powers of the input signal light 5 and the output signal light 6 and performing a control for more reliably maintaining the power of the output signal light 6 constant similarly to the third embodiment to the fifth embodiment in which a plurality of pumping wavelengths are used. Further, in the fifth embodiment, it is possible to estimate input signal light by monitoring power of the output signal light in lieu of input signal light as in the case of the fourth embodiment.

Sixth Embodiment

Figure 10:
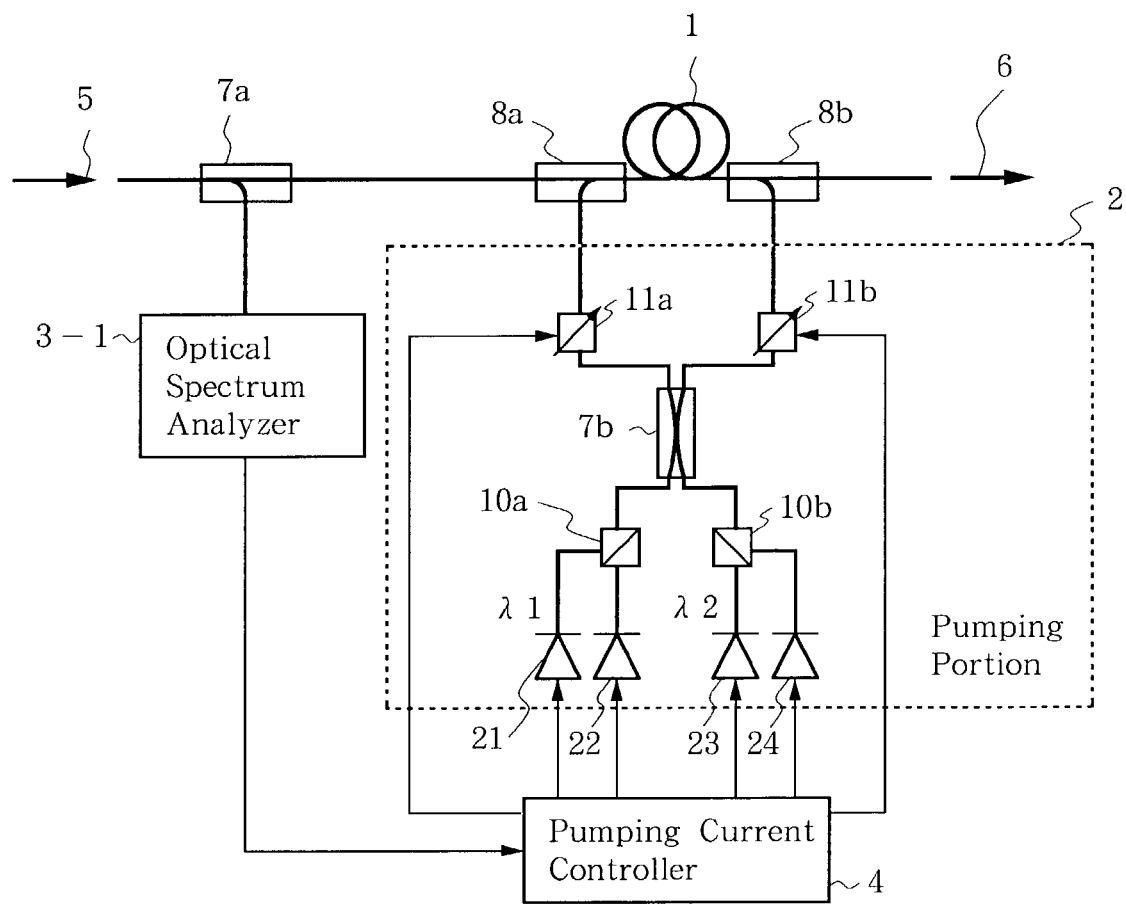
FIG. 10 is a block diagram showing a construction of an optical communication system and an optical amplifier according to a sixth embodiment of the present invention.

An optical communication system and an optical amplifier according to a sixth embodiment of the present invention will be described with reference to FIG. 10. In the sixth embodiment, an optical fiber 1 corresponds to the Raman amplification medium, pumping LDs 21 to 24, a coupler 7b, PBSs 10a and 10b and attenuators 11a and 11b correspond to the pumping portion, optical spectrum analyzer 3-1 corresponds to the monitor portion and a pumping current controller 4 corresponds to the control portion.

In the sixth embodiment, forward pumping means and backward pumping means are used commonly. In the construction of the sixth embodiment, pump lights emitted from the pumping LDs 21 and 22 and having wavelength λ1 are polarized and multiplexed by the PBS 10a and pump lights emitted from the pumping LDs 23 and 24 and having wavelength λ2 are polarized and multiplexed by the PBS 10b. The polarized and multiplexed pump lights having the respective wavelengths are de-multiplexed by the coupler 7b and a pump light synthesized from the pump lights having the respective wavelengths with substantially one-to-one ratio is ejected from two output ports with substantially the same powers. One of the synthesized pumping waves is injected through the attenuator 11a and the WDM coupler 8a into the optical fiber 1 in the same direction as that of the input signal light 5 and the other is injected through the attenuator 11b and the WDM coupler 8b into the optical fiber 1 in the opposite direction to the output signal light 6.

In the sixth embodiment, when ratio of gain given by the forward pump light to ratio of gain given by the backward pump light is changed according to a result of measurement by the optical spectrum analyzer 3-1, losses of the respective pump lights caused by the attenuators are changed by controlling the attenuators 11a and 11b. Particularly, in order to change a total light power while keeping the light power ratio of the pump lights, it is enough to change powers of the pump lights emitted from the pumping LDs 21 to 24 while keeping the amounts of loss of the attenuators. A construction in which one of the attenuators 11a and 11b is removed may be possible.

Figure 11:
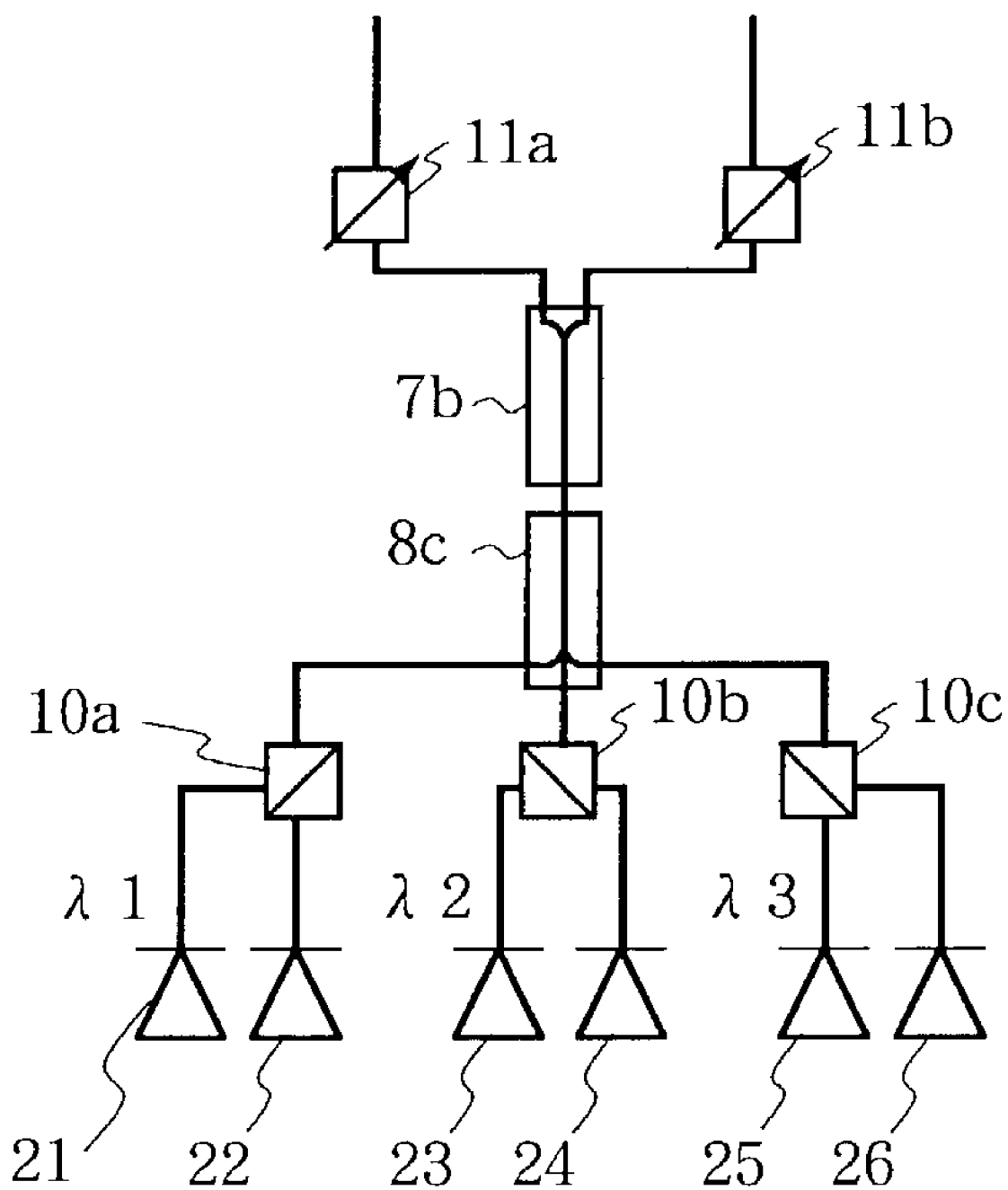
FIG. 11 is a block diagram showing a modification of the pumping portion shown in FIG. 10.

In a case where the pump light includes three or more wavelengths, the pumping portion may be replaced by one shown in FIG. 11. In such construction as shown in FIG. 11, pump lights having different wavelengths are temporarily added by a WDM coupler 8c and then branched to the forward and backward pump lights by the coupler 7b.

Seventh Embodiment

An optical communication system and an optical amplifier according to the present invention will be described with reference to FIG. 12. In the seventh embodiment, dispersion compensation fibers 1a and 1b correspond to the Raman amplification medium, pumping LDs 21a to 24a, PSBs 10a and 10b and a WDM coupler 8c correspond to the forward pumping portion, pumping LDs 21b to 24b, PSB 10c and 10d and a WDM coupler 8d correspond to the backward pumping portion, optical spectrum analyzers 3-1a to 3-1c correspond to the monitor portion and a pumping current controller 4 corresponds to the control portion. The dispersion compensation fiber means an optical fiber whose dispersion value is minus in at least a portion of a wavelength range of a signal light and an absolute value thereof is 20 ps/nm/km or more in at least a portion of the wavelength range of the signal light.

In the seventh embodiment shown in FIG. 12, the input signal light 5 is branched by the coupler 7a and a substantial portion of the input signal light 5 is incident on the dispersion compensation fiber 1a through the WDM coupler 8a and a portion of the input signal light is incident on the optical spectrum analyzer 3-1a. The optical spectrum analyzer 3-1a measures powers of the input signal light for respective wavelengths thereof and sends a result of measurement to the pumping current controller 4. The pumping current controller 4 controls pumping currents of the pumping LDs 21b to 24b according to the result of power measurement of the input signal light. The pumping LDs 21a to 24a and the pumping LDs 21b to 24b emit pump lights correspondingly to the pumping currents.

The two sets of pump lights emitted from the pumping LDs 21a to 24a and the pumping LDs 21b to 24b are injected through the WDM couplers 8a and 8b to the dispersion compensation fibers 1a and 1b in the same direction as and the opposite direction to the direction of the signal light, respectively. These pump lights produce gains given to the signal light by induced Raman effect in the dispersion compensation fibers 1a and 1b, respectively. The signal light given the gains is ejected as the output signal light 6 through the WDM coupler 8b, the isolator 14c and the coupler 7c.

The signal light injected into the dispersion compensation fiber 1a is Raman amplified in the dispersion compensation fiber 1a by the forward pump light and then a portion thereof is ejected through the coupler 7b. Power of the ejected light is measured by the optical spectrum analyzer 3-1b. The pumping current of the forward pump light is controlled according to a result of measurement of the light power and a result of measurement from the optical spectrum analyzer 3-1a.

In more detail, aimed values of power of the signal light measured by the optical spectrum analyzer 3-1b and ejected from the dispersion compensation fiber 1a for powers of the respective wavelengths of the input signal light 5 measured by the optical spectrum analyzer 3-1a are preliminarily stored in the pumping current controller 4 and the pumping current control is performed to achieve the aimed values.

The aimed value of power of the signal light ejected from the dispersion compensation fiber 1a is set such that it decreases with increase in input signal light. As a result, it becomes possible to reduce gain obtained by the forward pumping in the dispersion compensation fiber 1a when the input signal light 5 is increased. Therefore, it becomes possible to reduce an additional nonlinear waveform distortion due to increase in input signal light 5.

A control method for setting same aimed powers of signal lights for powers of all of the input signal lights 5 as power of signal light ejected from the dispersion compensation fiber 1a may be considered. In such case, since there is no need of measuring input signal light, the optical spectrum analyzer 3-1a and the coupler 7a can be removed.

Further, since, in the seventh embodiment, the pumping is performed by utilizing a plurality of wavelengths as the forward pump light, it becomes possible simultaneously to perform a control for making powers of the signal light ejected from the dispersion compensation fiber 1a for the wavelengths closer uniformly. In more detail, when the tilting of power of the signal light measured by the optical spectrum analyzer 3-1b and ejected from the dispersion compensation fiber 1a with respect to its wavelength shows reduction on the short wavelength side, it is enough to increase the pumping current of the pump light having shorter wavelength.

The output signal light 6 amplified by the dispersion compensation fiber 1a is injected through the coupler 7b into the dispersion compensation fiber 1b. The input signal 5 incident on the dispersion compensation fiber 1b is Raman amplified by the backward pump light. A portion of the amplified input signal light 5 is ejected through the coupler 7c and power thereof is measured by the optical spectrum analyzer 3-1c. In this case, power of the backward pump light is controlled such that light power detected by the optical spectrum analyzer 3-1c becomes a preliminarily set constant light power.

Particularly, when the control is performed such that the aimed value of power of the signal light ejected from the dispersion compensation fiber 1a is maintained constant for input signal light 5, the control in which gain given to the signal light in the dispersion compensation fiber 1a is maintained constant is performed, so that only the gain given to the signal light in the dispersion compensation fiber 1a is changed correspondingly to input signal light 5. As a result of such control, it becomes possible to control ratio of gain of the forward and backward pump lights correspondingly to input signal light 5.

Further, since the dispersion compensation fiber is utilized as the Raman amplification medium in the seventh embodiment, it is possible to perform the Raman amplification and the dispersion compensation simultaneously. Further, it is possible to change the number of isolators and/or change positions into which the isolators 14a to 14c. It may be possible to insert one or more isolators into appropriate positions in any of other embodiments than the seventh embodiment.

Further, means such as a WDM coupler, to which a conventional reflection-free terminal is connected, for preventing the forward pump light from being injected into the dispersion compensation fiber 1b may be provided between the coupler 7b and the dispersion compensation fiber 1b. Since, in such construction, one of light power measured by the optical spectrum analyzer 3-1b and light power measured by the optical spectrum analyzer 3-1c, which is higher than the other, is guaranteed as the maximum light power in the dispersion compensation fiber 2b, the construction is advantageous when the maximum light power in the dispersion compensation fiber is to be limited. By limiting the maximum light power, it is possible to limit nonlinear waveform distortion within the optical fiber.

Eighth Embodiment

An optical communication system and an optical amplifier according to an eighth embodiment of the present invention will be described with reference to FIG. 13 to FIG. 24. In the seventh embodiment, the dispersion value of each of the optical fibers 1, 1a and 1b corresponding to the Raman amplification medium is minus in at least a portion of a wavelength range of a signal light and an absolute value thereof is 20 ps/nm/km or more in at least a portion of the wavelength range of the signal light. In the eighth embodiment, the Raman amplification is applied to an optical fiber having dispersion value in the order of 2~8 ps/nm/km within a wavelength range of a signal light. By doing so, the present optical communication system and optical amplifier can be applied to optical fibers having various wavelength dispersion characteristics.

In the prior art, there is a problem when Raman amplification is applied to an optical fiber having dispersion value in the order of 2 to 8 ps/nm/km. This is because, since dispersion of the optical fiber in the vicinity of wavelength of the pump light is too small even when dispersion in the vicinity of wavelength in the wavelength range of the signal light is large enough, FWM occurs efficiently. Therefore, energy component of pump light is shifted to the signal light by FWM occurring between pump lights or between pump light and the signal light and interferes the signal light, causing the signal quality thereof to be degraded. This problem becomes serious particularly when the Raman amplification occurs with the forward pumping.

The eighth embodiment, which is capable of avoiding degradation of signal quality by restricting an amount of generation of light wave in the wavelength range of the signal light due to FWM by appropriately allocating wavelength and/or power of the pump light used for Raman amplification, will be described in more detail with reference to examples.

EXAMPLE 1

Figure 13:
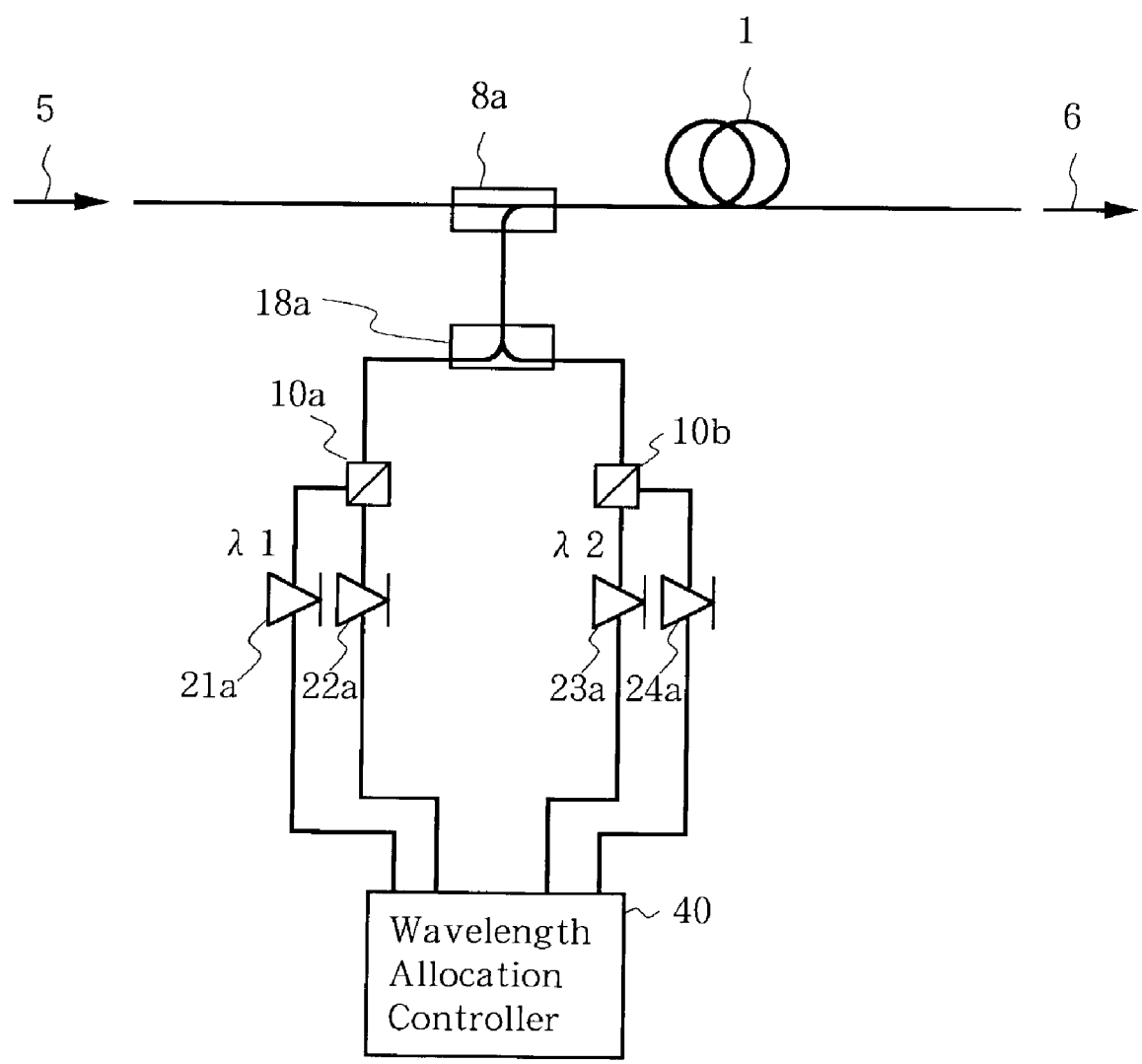
FIG. 13 is a block diagram showing a Raman amplifier according to an eighth embodiment of the present invention.

In the example shown in FIG. 13, an input signal light 5 is incident on the optical fiber 1 through a WDM coupler 8a. Pump lights having peak wavelength $\lambda 1$ and generated by pumping laser diodes (pumping LDs) 21a and 22a are incident on a PBS 10a as orthogonal-polarized waves and multiplexed. Similarly, pump lights having peak wavelength $\lambda 2$ ($>\lambda 1$) and generated by pumping laser diodes (pumping LDs) 23a and 24a are incident on a PBS 10b and multiplexed. The polarized and multiplexed pump lights having wavelengths $\lambda 1$ and $\lambda 2$ are wavelength multiplexed by a WDM coupler 18a. The wavelength multiplexed pump light is injected through the WDM coupler 8a to the optical fiber 1 in the direction of the signal light. The wavelength multiplexed pump light gives gain to the signal light by induced Raman effect. The signal light given the gain is ejected as the output signal 6.

Figure 14:
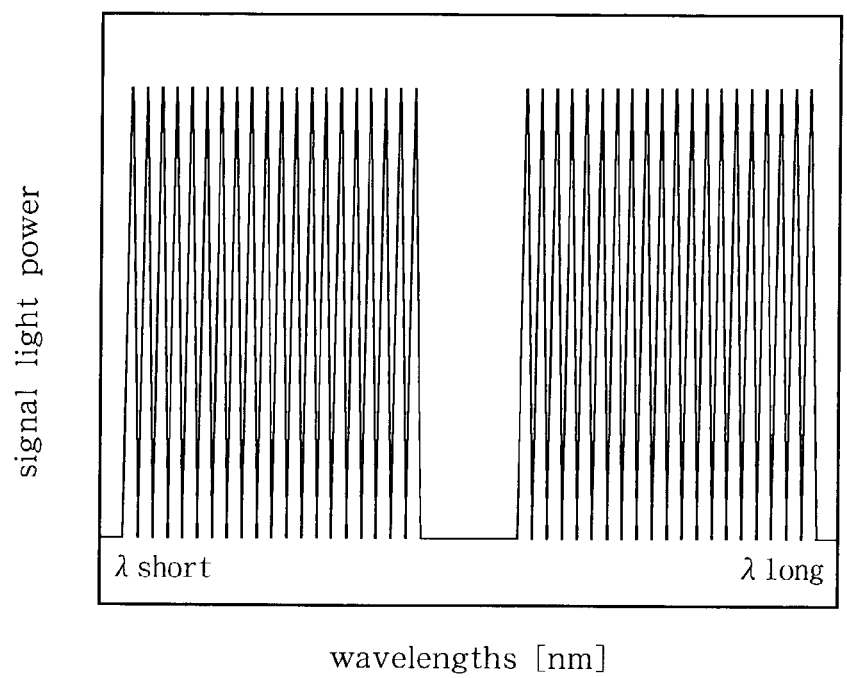
FIG. 14 shows wavelengths of signal light.

The wavelengths of the input signal light 5 and the pump light have a relation to be described next. For example, it is assumed that the shortest wavelength in the wavelength range of the input signal light is $\lambda$short and the longest wavelength in the wavelength range of the input signal light 5 is $\lambda$long as shown in FIG. 14. In this example, the peak wavelengths $\lambda 1$ and $\lambda 2$ of the pump lights are set to satisfy the following equation:

$$\lambda short > \lambda 1 \times \lambda 2 \times (2\lambda 1 - \lambda 2)$$

or $$\lambda 1 \times \lambda 2 \times (2\lambda 1 - \lambda 2) > \lambda long$$

As a result, light wave generated at wavelength of $$\lambda FWM = \lambda 1 \times \lambda 2 / (2\lambda 1 - \lambda 2)$$

by FWM between the wavelengths of the pump lights does not interfere with the signal light. Therefore, it becomes possible to avoid degradation of the signal light due to light wave generated by FWM between the pump lights. Incidentally, in FIG. 14, the abscissa indicates wavelength and the ordinate indicates power of signal light.

Figure 18:
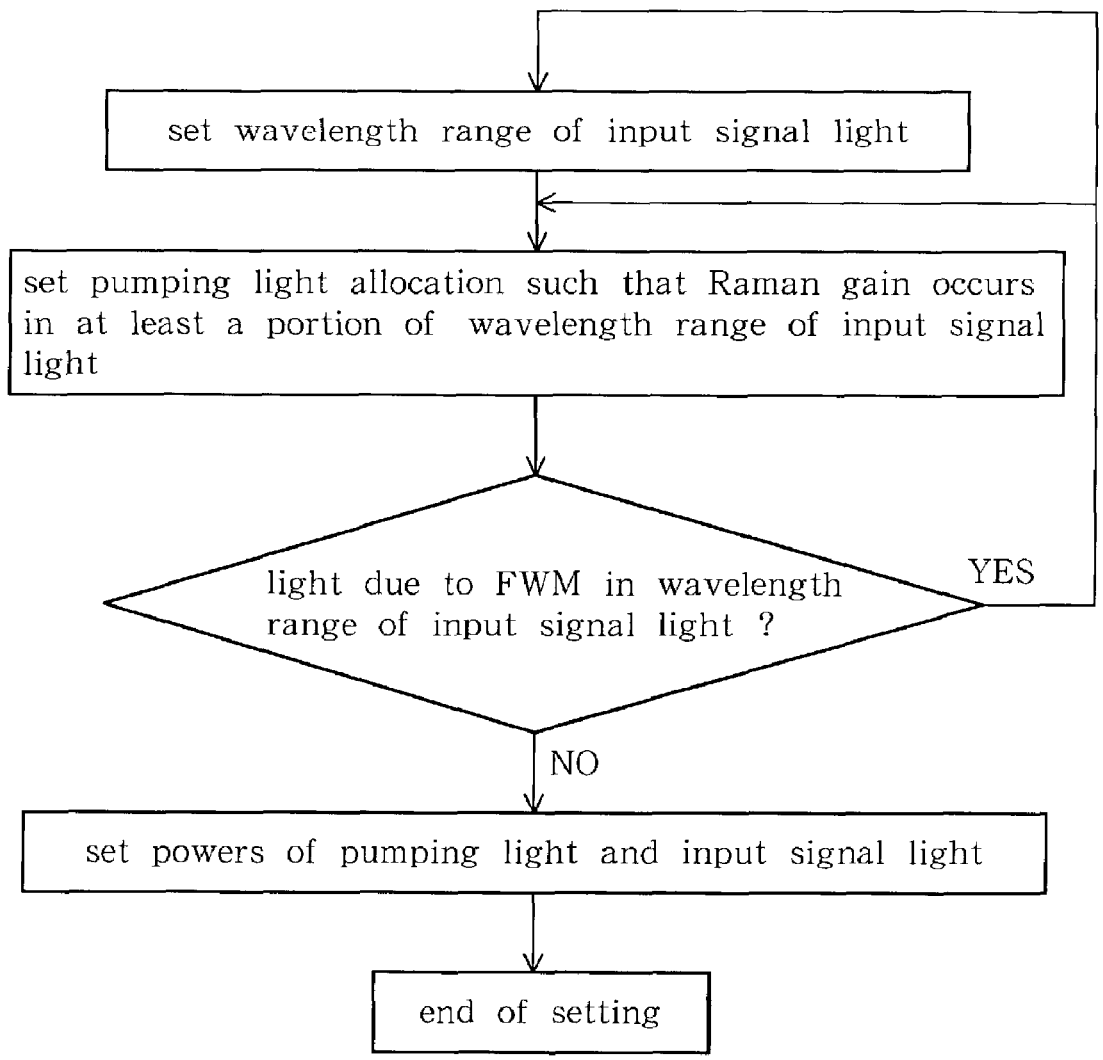
FIG. 18 is a flowchart showing a flow of a practical pumping wavelength determination executed by a wavelength allocation controller.

FIG. 18 is a flowchart showing a flow for determining wavelength of a pump light, which is executed by a wavelength allocation controller 40. First, a wavelength range of the input signal light 5 is determined. Subsequent thereto, a wavelength of a Raman pump light source, with which Raman gain is generated, is arranged in at least a portion of the wavelength range. Thereafter, it is confirmed that the pumping wavelength satisfies the above mentioned conditional equation. Since, when the equation is satisfied, the signal degradation due to FWM is avoided, powers of respective pump lights and input signal light 5 are determined. When the conditional equation is not satisfied, the allocation of the pump lights is changed. For example, the number of pump lights may be reduced. When it is impossible to satisfy the equation by merely changing the allocation of the pump lights, the wavelength range of the signal light is changed.

Figure 15:
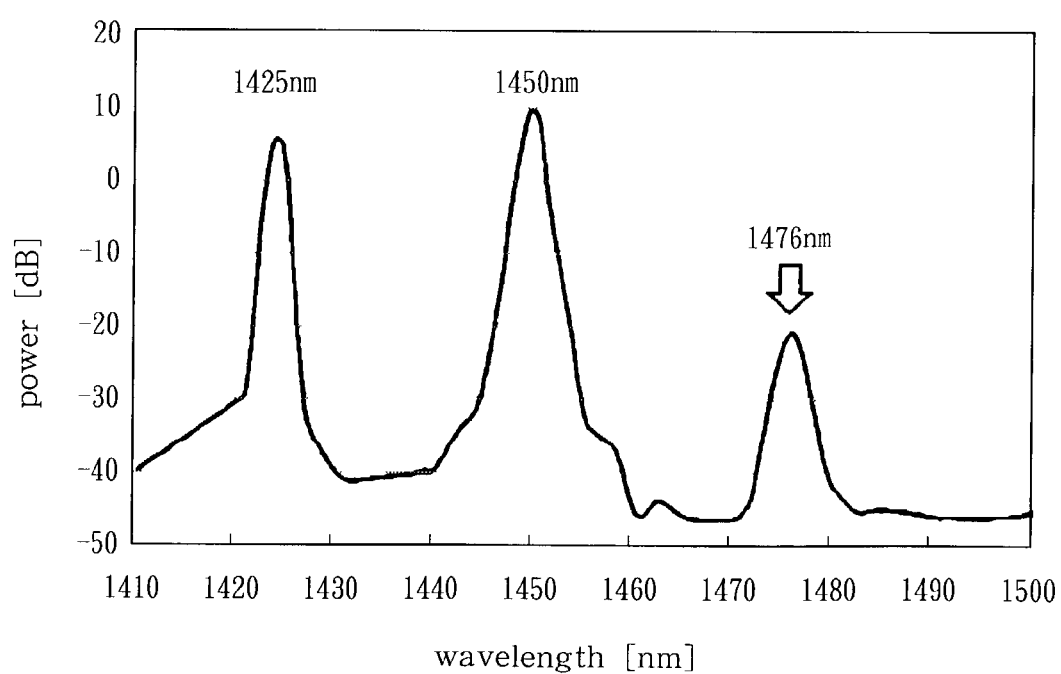
FIG. 15 shows power of light waves generated by FWM.

It is assumed, for example, that the pumping peak wavelength $\lambda 1=1425$ nm and $\lambda 2=1450$ nm. In such case, wavelength $\lambda FWM$ of light generated by FWM between pump lights is 1476 nm. FIG. 15 shows an optical spectrum at an output terminal of a non-zero dispersion shift fiber 40 km long when lights having wavelengths $\lambda 1$ and $\lambda 2$ each of 100 mW are injected to an input terminal of the fiber. In FIG. 15, the abscissa indicates wavelength and the ordinate indicates power. Spectrum resolution is 2 nm. It is clear from FIG. 15 that light wave having wavelength of 1476 nm and having power of about −21 dBm per 2 nm is generated by FWM between the pimp lights. Therefore, there is a probability of degradation of signal quality since this light wave interferes with the signal light having wavelength of 1476 nm (S band). However, this problem can be solved according to the present invention by setting the shortest wavelength of the S band signal light to a wavelength longer than 1476 nm.

In the above description, the wavelength allocation controller 40 executes the pumping wavelength determination procedure shown in the flowchart in FIG. 18 every time when the wavelength range of the input signal light 5 is determined. However, it is possible that the construction of the wavelength allocation controller 40 is simplified. That is, pumping wavelengths are preliminarily determined by executing the pumping wavelength determination procedure shown in FIG. 18 for every wavelength range of a plurality of input signal lights and a table recording a plurality of pumping wavelengths corresponding to the wavelength ranges of the input signal lights 5 on the basis of the determined pumping wavelengths is produced. The table is set in the wavelength allocation controller 40. In such case, the pumping wavelength is determined by searching the table of pumping wavelength corresponding to the determined wavelength range of the input signal light 5.

It should be noted that light having power of about −2 dBm per 2 nm generated in the vicinity of wavelength of 1476 nm shown in FIG. 15 is not a light generated by only FWM. That is, the light power is a sum of powers of light wave generated by FWM and other light waves (mainly Raman ASE, etc.). Therefore, in order to calculate power of light wave due to FWM, it is necessary to subtract powers of other light waves according to the following equation:

power [$W$] of light wave generated by $FWM$=(power [$W$] on spectrum analyzer)−(powers [$W$] of other light waves)

Figure 16:
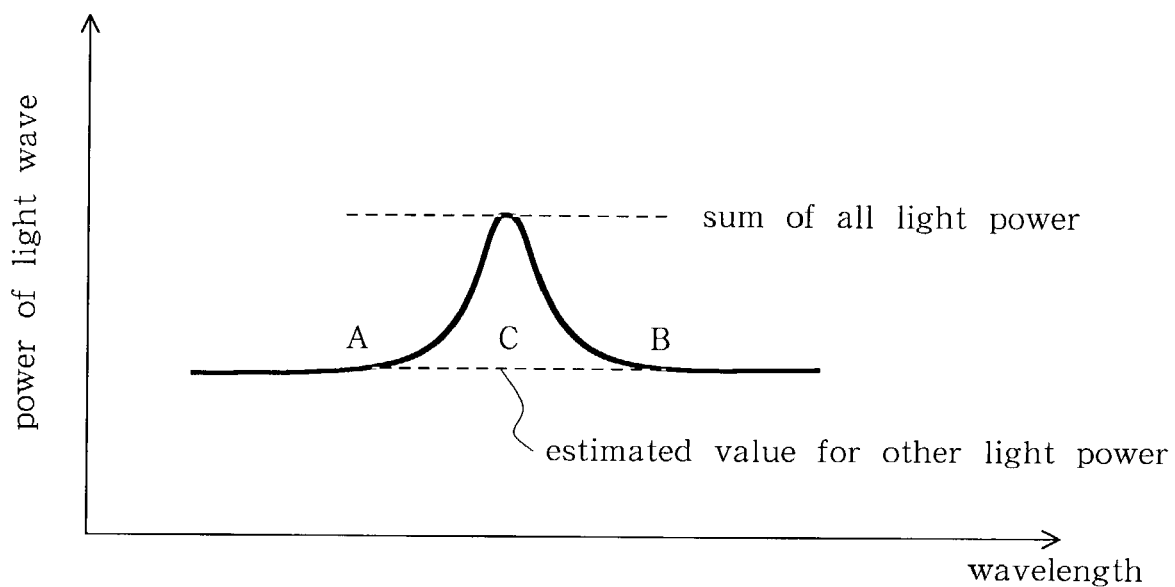
FIG. 16 is a graph illustrating a typical method for estimating power of light waves other than that generated by FWM such as Raman ASE.

However, since an information obtainable from the spectrum is only total power of all light waves, powers of other light waves are usually obtained by estimation. FIG. 16 shows a typical estimation method of powers of other light waves, in which powers of other light waves are obtained from powers of other lights at wavelengths in the vicinity thereof by linear approximation. In FIG. 16, the abscissa indicates wavelength and the ordinate indicates power of light wave. In this linear approximation, power values of other light waves in wavelength positions (point A and point B) close to a wavelength at which light wave generated by FWM is connected by a straight line and power value of the other light waves at a point (point C) to be estimated is approximated by a value on the straight line. Since, in the example in FIG. 15, power of other light waves at 1470 nm is −46.4 dBm (2.29×10-8 W) and power of other light wave at 1482 nm is −45.1 dBm (3.09×10-8 W), power of other light wave at 1476 nm is estimated as −45.7 dBm (2.69×10-8 W). Therefore, power of light due to FWM becomes 7.24×10-6−2.69×10-8=7.22×10-6 W (−21.41 dBm) since power at 1476 nm on the spectrum analyzer is −21.4 dBm (7.24×10-6 W) as mentioned above. In this example, there is no substantial difference between power on the spectrum analyzer and power of light wave due to FWM since power of other light wave is low. However, since the difference becomes large in a case to be described later in which power of light wave due to FWM is relatively large, the calculation must be done precisely.

EXAMPLE 2

Figure 17:
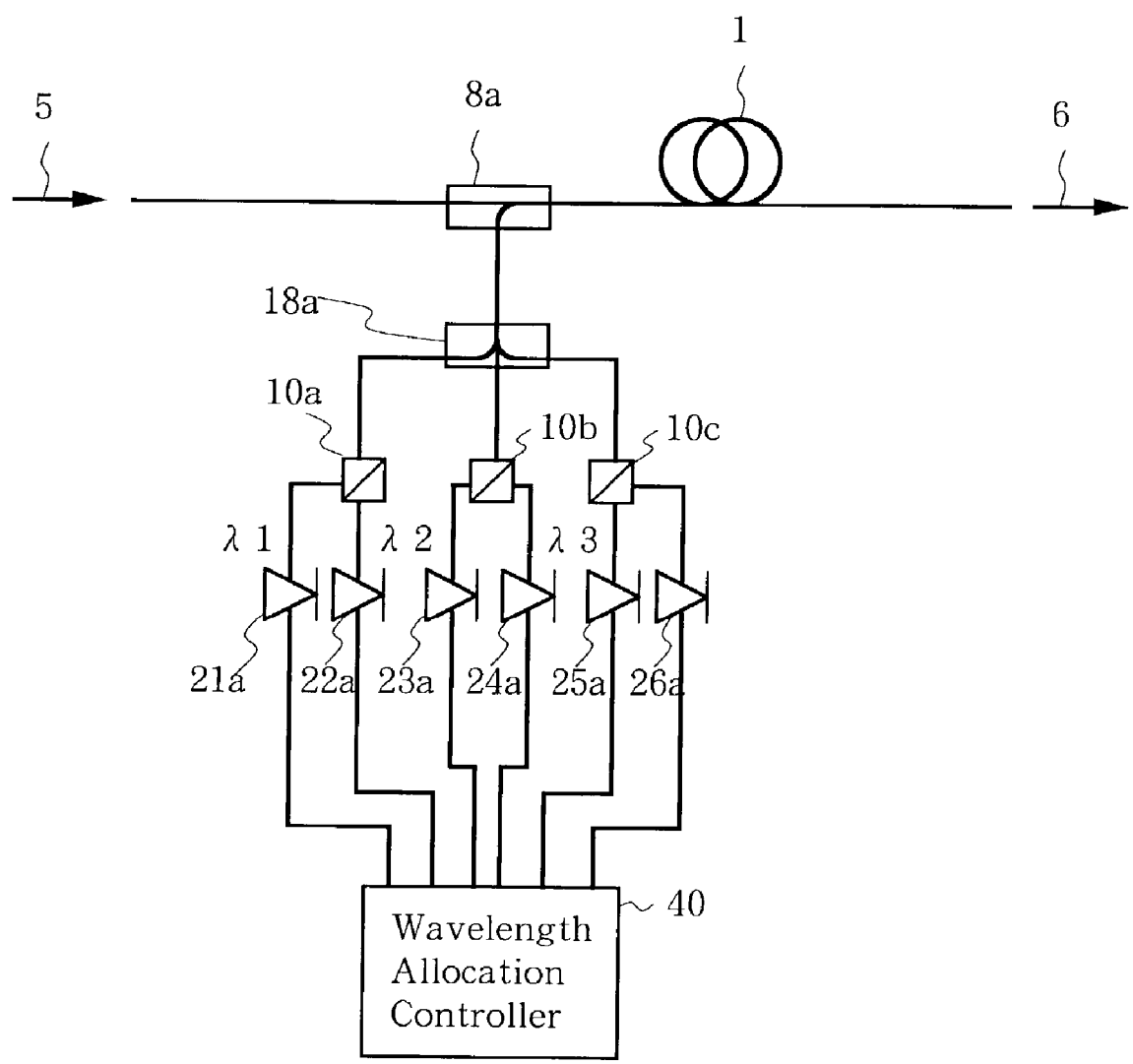
FIG. 17 is a block diagram of a modification of the Raman amplifier shown in FIG. 13.

In the example shown in FIG. 17, an input signal light 5 is incident on an optical fiber 1 through a WDM coupler 8a. Pump lights generated by pumping LDs 21a and 22a and having peak wavelength λ1 are incident on a PBS 10a as orthogonal-polarized waves and multiplexed thereby. Similarly, pump lights generated by pumping LDs 23a and 24a and having peak wavelength λ2 (>λ1) are incident on a PBS 10b as orthogonal-polarized waves and multiplexed thereby and pump lights generated by pumping LDs 25a and 26a and having peak wavelength λ3(>λ2>λ1) are incident on a PBS 10c as orthogonal-polarized waves and multiplexed thereby. The polarized and multiplexed pump lights having wavelengths λ1, λ2 and λ3 are wavelength multiplexed by a WDM coupler 18a. The wavelength multiplexed pump light is injected to the optical fiber 1 through the WDM coupler 8a in the same direction as that of the signal light 5. The wavelength multiplexed pump light gives gain to the signal light by induced Raman effect. The signal light having the gain is ejected as an output signal light 6.

The wavelengths of the input signal light 5 and the pump lights have a mutual relation to be described. For example, it is assumed that the shortest wavelength in the wavelength range of the input signal light 5 is λshort and the longest wavelength in the same wavelength range is λlong. In this case, the peak wavelengths λ1, λ2 and λ3 of the pump lights are set such that these wavelengths satisfy the following equation:

λshort>λ3×λ2×λ1/(λ2×λ1−λ3×λ2+λ3×λ1)

or

λ3×λ2×λ1/(λ2×λ1−λ3×λ2+λ3×λ1)>λlong

As a result, it becomes possible to avoid signal degradation due to light wave generated by FWM between the pump lights since light wave having wavelength λFWM (=λ3×λ2×λ1/(λ2×λ1−λ3×λ2+λ3×λ1)) generated by FWM does not interfere with the input signal light 5.

Figure 20:
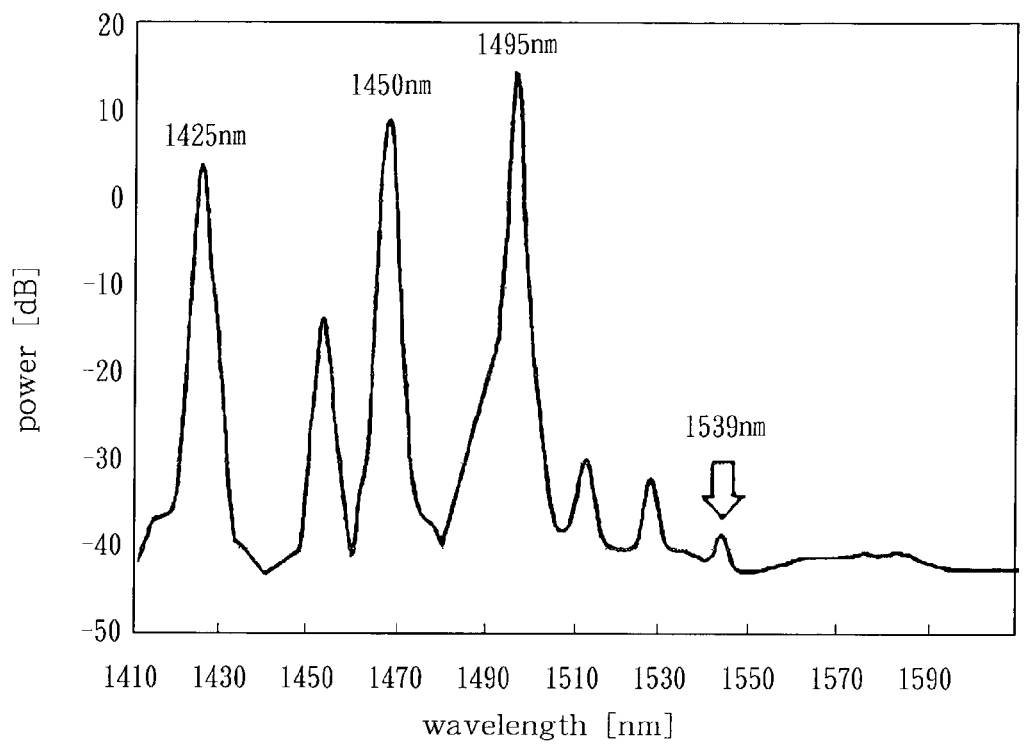
FIG. 20 shows power of light wave generated by FWM.

For example, assuming λ1=1425 nm, λ2=1465 nm and λ3=1495 nm, λFWM becomes 1539 nm. FIG. 20 shows an optical spectrum at an output terminal of a non-zero dispersion shift fiber 40 km long when lights having wavelengths λ1, λ2 and λ3 and having energies of 250 mW, 100 mW and 100 mW, respectively, are injected to an input terminal of the fiber. In FIG. 20, the abscissa indicates wavelength and the ordinate indicates power. Spectrum resolution is 2 nm. It is clear from FIG. 20 that light wave having power of about −41 dBm per 2 nm (value obtained by subtracting power of other light wave, which is estimated) at wavelength of 1539 nm is generated by FWM between the pimp lights. Therefore, there is a probability of degradation of signal quality since this light wave interferes with the signal light having wavelength of 1539 nm (C band). However, this problem can be solved according to the present invention by setting the shortest wavelength of the C band signal light to a wavelength longer than 1539 nm or by constructing the pump light with two wavelengths λ1 and λ2. In the latter case, since wavelength of light wave generated by FWM is 1507 nm, the wavelength range of the input signal light 5 must be set such that it does not include 1507 nm.

EXAMPLE 3

In the example shown in FIG. 17, since the pump light wavelengths are λ1, λ2 (>λ1) and λ3 (>λ2>λ1), light wave is generated in any portion in the longitudinal direction of the optical fiber 1 by FWM between pump lights. The wavelength and/or power of light wave is set such that power of light wave having wavelength λFWM (=λ3×λ2×λ1/(λ2×λ1−λ3×λ2+λ3×λ1)) generated by FWM becomes smaller than power of the signal light having wavelength close to λFWM by 20 dB or more, that is, one hundredth or smaller. Although light wave having wavelength λFWM (=λ3×λ2×λ1/(λ2×λ1−λ3×λ2+λ3×λ1)) generated by FWM interferes with the input signal light 5 and degradation of signal quality occurs as a result, it is possible to substantially suppress influence thereof.

A concrete flow of the pumping wavelength determination executed by the wavelength allocation controller 40 is described with reference to a flowchart shown in FIG. 19. First, the wavelength range of the input signal light 5 is determined and then wavelength of the Raman pump light source is arranged in the wavelength range such that Raman gain is obtained in at least a portion of the wavelength range. Thereafter, powers of the input signal light 5 and the respective pump lights are set. Thereafter, it is confirmed by experimentally or calculation whether power of light wave having wavelengthλFWM (=λ3×λ2×λ1/(λ2×λ1−λ3×λ2+λ3×λ1)) generated by FWM in any position of the optical fiber in the longitudinal direction thereof is smaller than power of the signal light 5 having wavelength close to λFWM by 20 dB or more, that is, one hundredth or smaller. When the conditional equation is satisfied, signal degradation due to FWM is suppressed enough and the setting is completed. When the conditional equation is not satisfied, powers of the pump lights are changed, that is, reduced. When the conditional equation can not be satisfied by only the change of the pumping light powers, input signal light 5, the wavelength allocation of the pump lights and the wavelength allocation of the input signal light 5 are changed.

Figure 19:
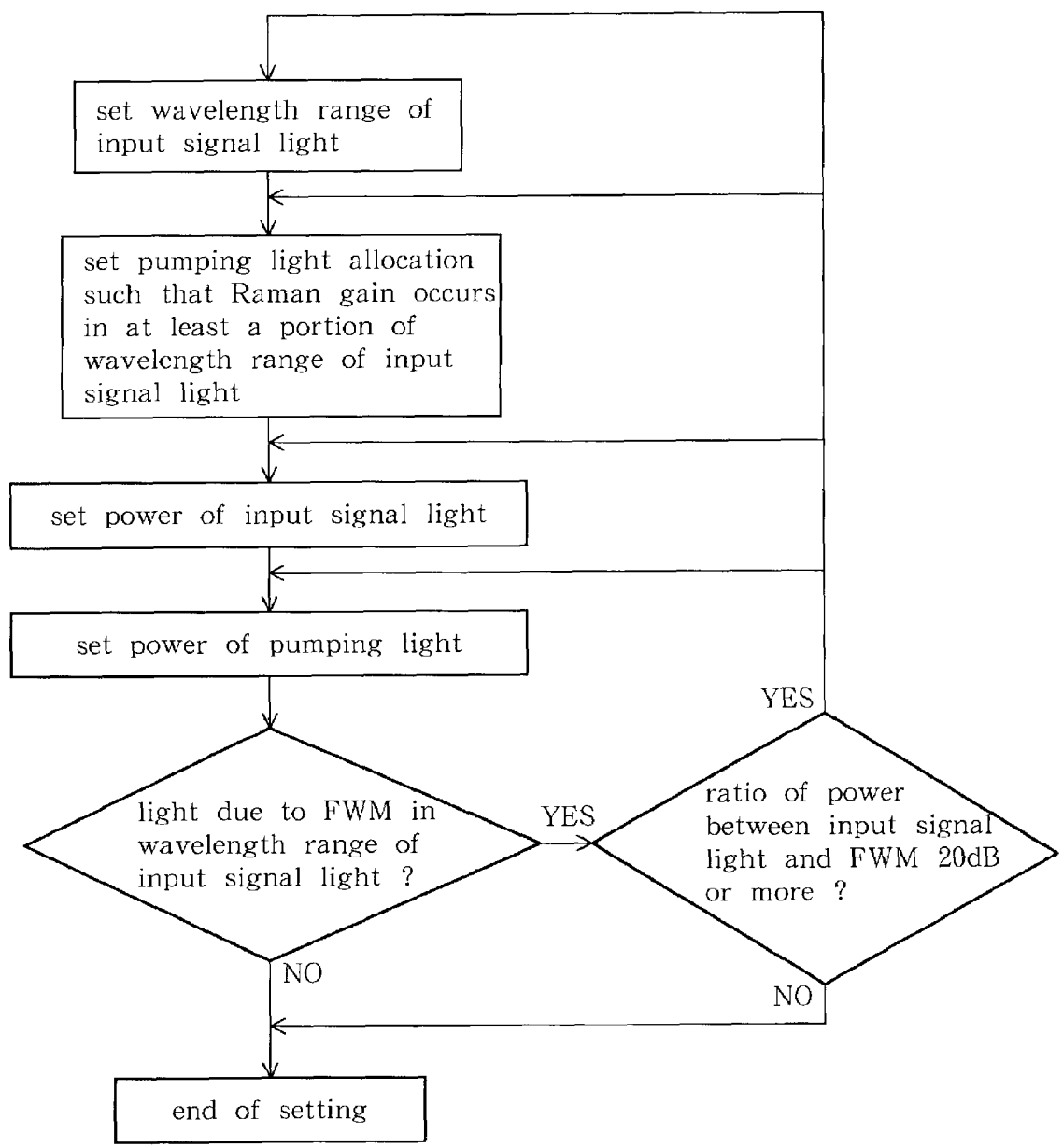
FIG. 19 is a flowchart showing a flow of a practical pumping wavelength determination executed by a wavelength allocation controller.

In the above description, the wavelength allocation controller 40 executes the pumping wavelength determination procedure shown in the flowchart in FIG. 19 every time when the wavelength range of the input signal light 5 is determined. However, it is possible that the construction of the wavelength allocation controller 40 is simplified. That is, pumping wavelengths are preliminarily determined by executing the pumping wavelength determination procedure shown in FIG. 19 for every wavelength range of a plurality of input signal lights and a table recording a plurality of pumping wavelengths corresponding to the wavelength ranges of the input signal lights 5 on the basis of the determined pumping wavelengths is produced. The table is set in the wavelength allocation controller 40. In such case, the pumping wavelength is determined by searching the table of pumping wavelength corresponding to the determined wavelength range of the input signal light 5.

For example, assuming $\lambda 1=1425$ nm, $\lambda 2=1465$ nm and $\lambda 3=1495$ nm, $\lambda$FWM becomes 1539 nm. It is further assumed that the shortest wavelength of the input signal light 5 is 1530 nm and the longest wavelength thereof is 1605 nm. In such case, there is a possibility of interference between the light wave generated by FWM of the pump lights and the input signal light, causing the signal quality to be degraded.

Figure 21:
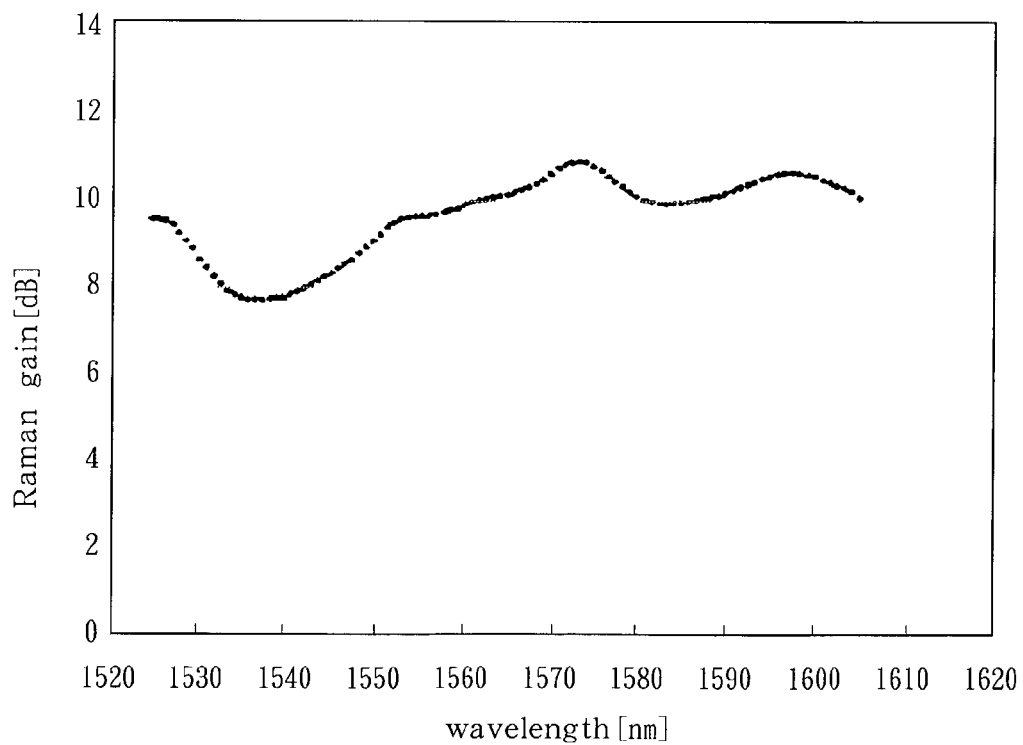
FIG. 21 shows a result of simulation calculation of Raman gain.

For example, when lights having wavelengths $\lambda 1$, $\lambda 2$ and $\lambda 3$ and having energies of about 250 mW, about 100 mW and about 100 mW, respectively, are injected to an input terminal of a non-zero dispersion shift fiber 40 km long, light wave having power of about −41 dBm per 2 nm at wavelength of 1539 nm is generated by FWM between the pimp lights as shown in FIG. 20. In this case, Raman gain obtained by simulation is about 8 dB as shown in FIG. 21. In FIG. 21, the abscissa indicates wavelength and the ordinate indicates power. Further, loss of the Raman amplification medium at the signal light wavelength is about 8 dB. Therefore, assuming that input signal light 5 to the Raman amplification medium is −5 dBm per one wavelength channel, the signal light power at the output terminal of the fiber becomes −5−8+8=−5 dBm. On the other hand, since power of light wave generated by FWM between the pump lights at the output terminal of the fiber is about −41 dBm as mentioned previously, ratio thereof to the signal light becomes about 36 dB. In the present invention, the wavelength and/or power of the pump light is arranged or set such that ratio of power between the input signal light 5 and the light wave generated by FWM becomes 20 dB or more. For example, assuming input signal light 5 to the Raman amplification medium being −25 dB per one wavelength channel, the signal light power at the output terminal of the fiber is −25−8+8=−25 dBm and ratio of power between the input signal light 5 and the light wave generated by FWM, etc., becomes 16 dB, which is smaller than 20 dB. In such case, degradation given to the signal by the light wave due to FWM becomes substantial. In order to avoid this, it is effective to reduce degradation by reducing an amount of generation of light wave generated due to FWM by reducing power of the respective pump lights and/or preventing light wave due to FWM from occurring in the wavelength range of the signal light by changing wavelengths of the pump lights, according to the present invention.

Figure 22:
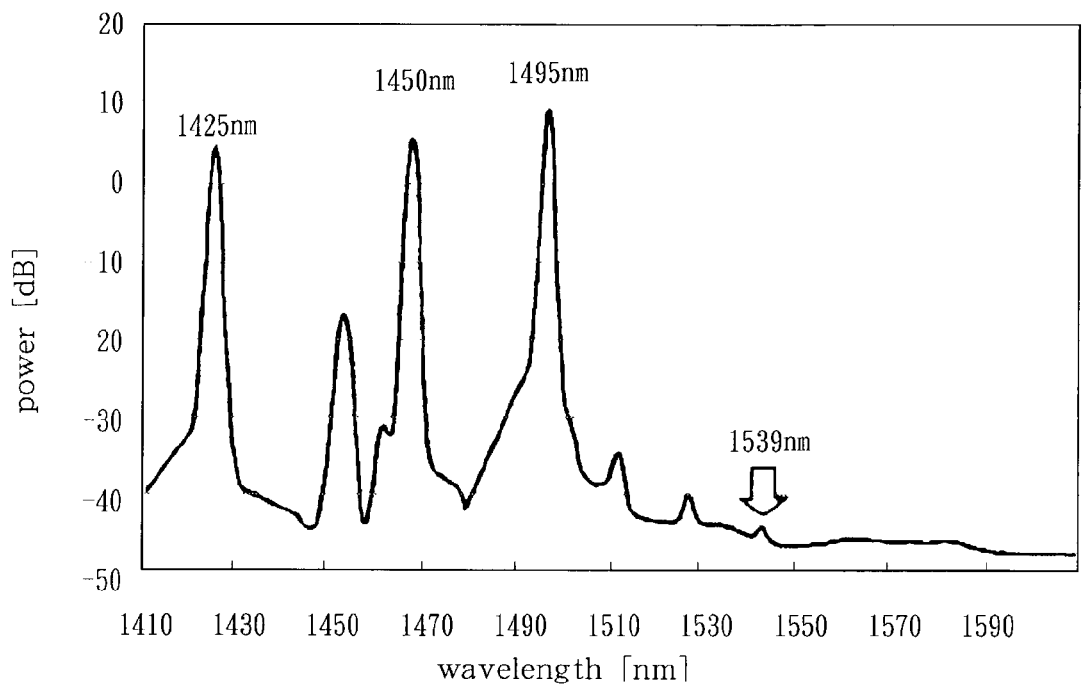
FIG. 22 shows power of light generated by FWM.
Figure 23:
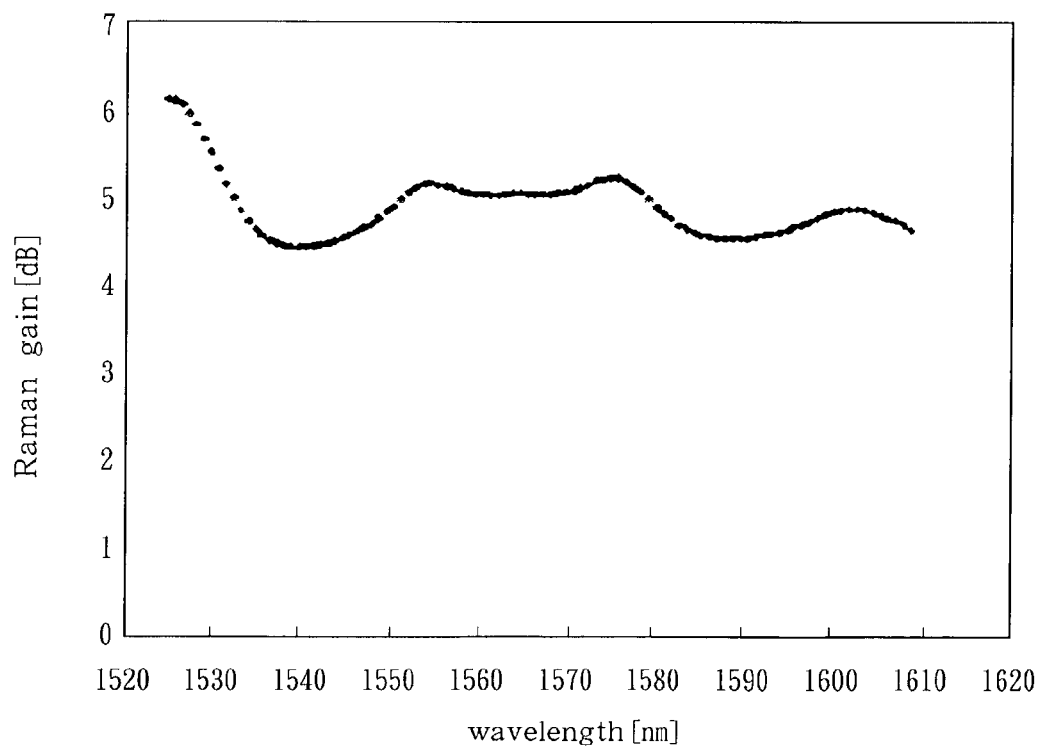
FIG. 23 shows a result of simulation calculation of Raman gain.

For example, considering a case where the setting of the energies of the lights having wavelengths $\lambda 1$, $\lambda 2$ and $\lambda 3$ of respective about 250 mW, about 100 mW and about 100 mW is changed to about 150 mW, about 50 mW and about 50 mW, respectively, power of light wave generated by FWM at 1539 nm becomes about −50 dBm as shown in FIG. 22. In FIG. 22, the abscissa indicates wavelength and the ordinate indicates power. According to a simulation shown in FIG. 23, Raman gain in this case is about 4.5 dB. In FIG. 23, the abscissa indicates wavelength and the ordinate indicates Raman gain. Therefore, even when input signal light 5 is −5 dB per one wavelength channel, ratio of power between the input signal light 5 and the light wave generated by FWM becomes 21.5 dB by a calculation similar to that mentioned above, which is larger than 20 dB. In this manner, by setting the pumping light powers appropriately according to the present invention, it becomes possible to suppress the influence of signal degradation due to FWM.

EXAMPLE 4

Figure 24:
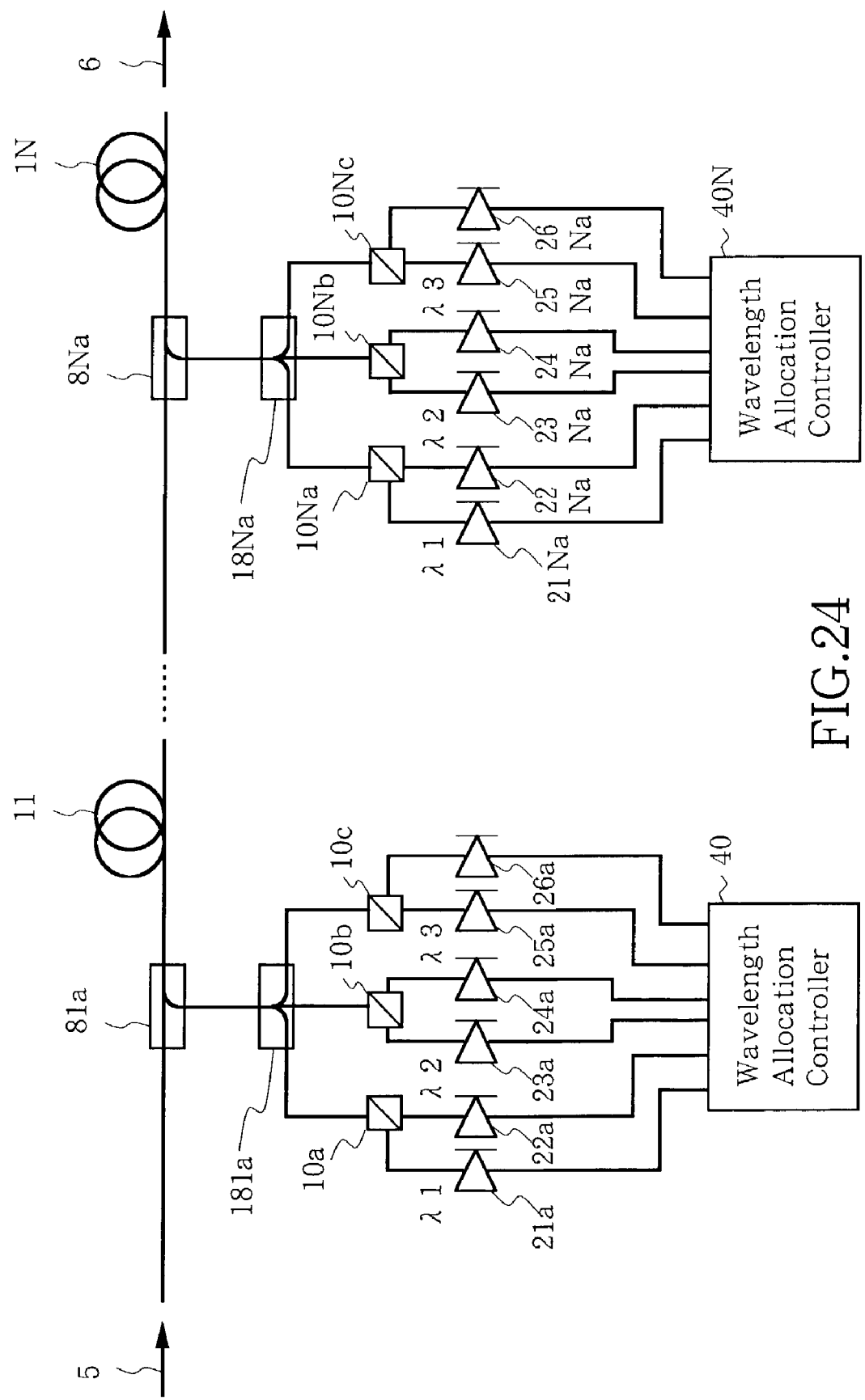
FIG. 24 is a block diagram of another modification of the Raman amplifier shown in FIG. 13.

A construction shown in FIG. 24 includes a plurality (N) of the constructions each shown in FIG. 17, where N is an integer equal to or larger than 2. In this construction, wavelength and/or power of the pump light is set such that power of light wave having wavelength $\lambda$FWM ($=\lambda 3 \times \lambda 2 \times \lambda 1/(\lambda 2 \times \lambda 1 - \lambda 2 + \lambda 3 \times \lambda 1)$) generated by FWM in any position of the optical fibers 11 to 1N in the longitudinal direction thereof becomes smaller than power of the signal light 5 having wavelength close to $\lambda$FWM by 20 dB or more, that is, one hundredth or smaller. As a result, light wave having wavelength $\lambda$FWM ($=\lambda 3 \times \lambda 2 \times \lambda 1/(\lambda 2 \times \lambda 1 - 3 \times \lambda 2 + \lambda 3 \times \lambda 1)$) generated by FWM interferes with the signal light, causing degradation of signal quality. However, its influence can be suppressed substantially.

For example, it is assumed that pump lights having peak wavelengths $\lambda 1=1425$ nm, $\lambda 2=1465$ nm and $\lambda 3=1495$ nm and having energies of about 250 mW, about 100 mW and about 100 mW, respectively, are injected (in this case, $\lambda$FWM becomes 1539 nm) similarly to the construction shown in FIG. 17. In a transmission over a plurality of spans, an amount of generation of light wave generated by FWM is accumulated and becomes N times in the worst case. Therefore, if N is 100 spans (20 dB), power of light wave generated by FWM between pump lights may become −41+20=−21 dB. Therefore, assuming that input signal light 5 is −5 dB per one wavelength channel, ratio of power between the input signal light 5 and the light wave generated by FWM becomes 16 dB, which is smaller than 20 dB. In such case, the degradation of the input signal light 5 caused by the light wave generated by FWM becomes substantial. In order to avoid this degradation, it is effective to reduce degradation by reducing an amount of generation of light wave generated due to FWM by reducing power of the respective pump lights and/or preventing light wave due to FWM from occurring in the wavelength range of the input signal light 5 by changing wavelengths of the pump lights, according to the present invention.

Figure 25:
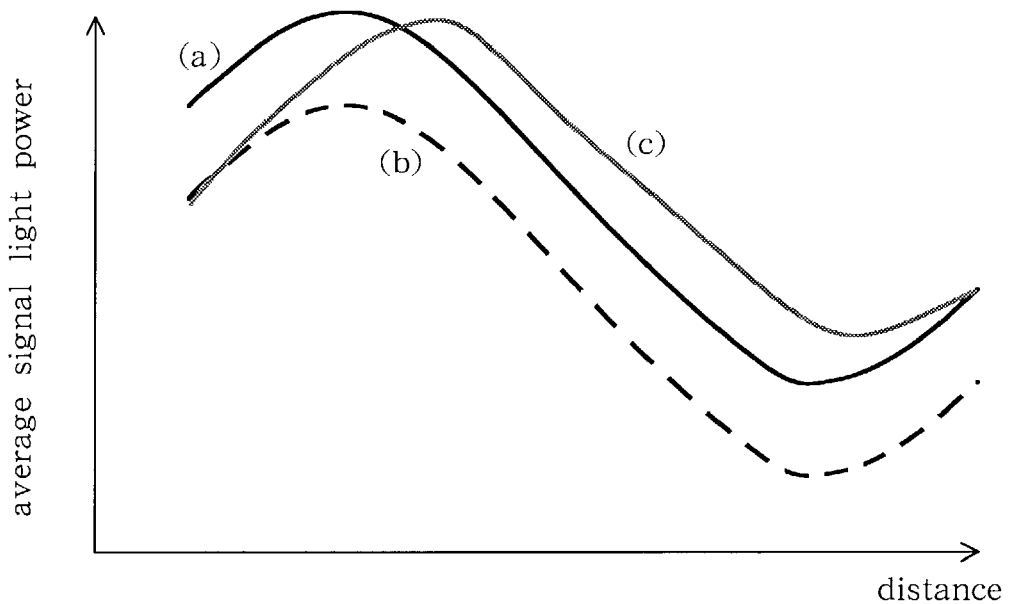
FIG. 25 shows variation of the signal power distribution under control of the present invention when the input signal light power is lowered.

Effects of the present invention will be described. For example, it is assumed that the system is initially set to optimal light powers with which degradation of signal quality becomes minimum as shown by curve (a) in FIG. 25. When input signal light is lowered for some reason while wavelength characteristics being kept constant as shown by curve (b) in FIG. 25, the reduction of the signal light power is detected in the monitoring step and a control for increasing ratio of gain given by the forward pump light and decreasing ratio of gain by the backward pump light shown by curve (c) in FIG. 25 is performed in the pumping controlling step (the output signal power is controlled at constant simultaneously).

In the prior art, the signal quality is degraded by Raman ASE generated by the backward pumping when the input signal light power is reduced. In the present invention, however, it becomes possible to suppress such degradation by reducing ratio of the backward pumping with which an amount of Raman ASE is large.

Figure 35:
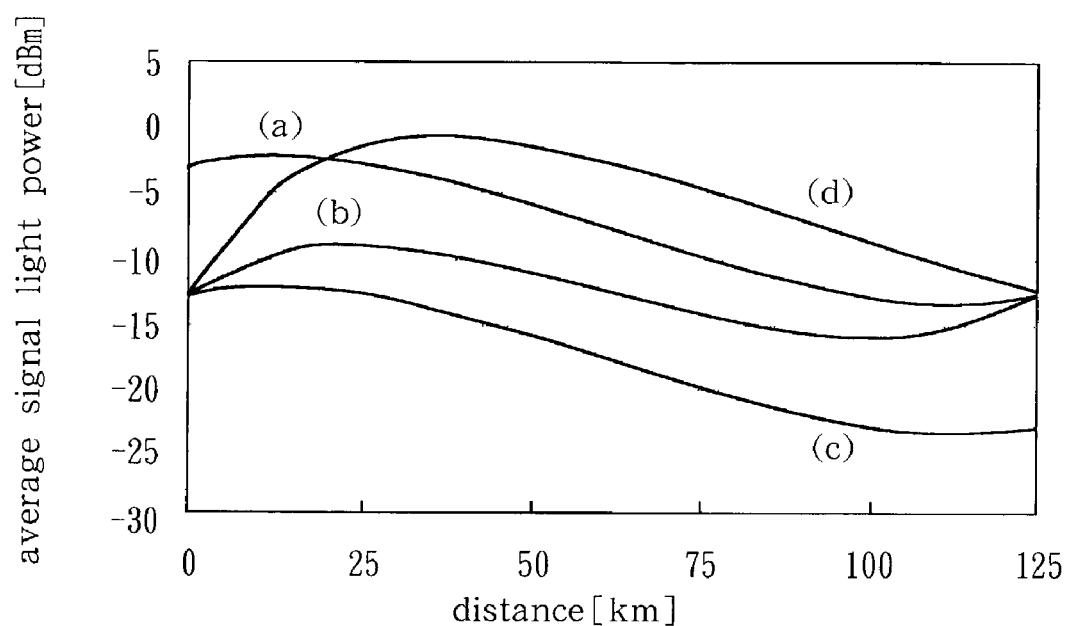
FIG. 35 shows a result of calculation of a simulated optical transmission system using Raman amplification.
Figures 36A, 36B, 36C:
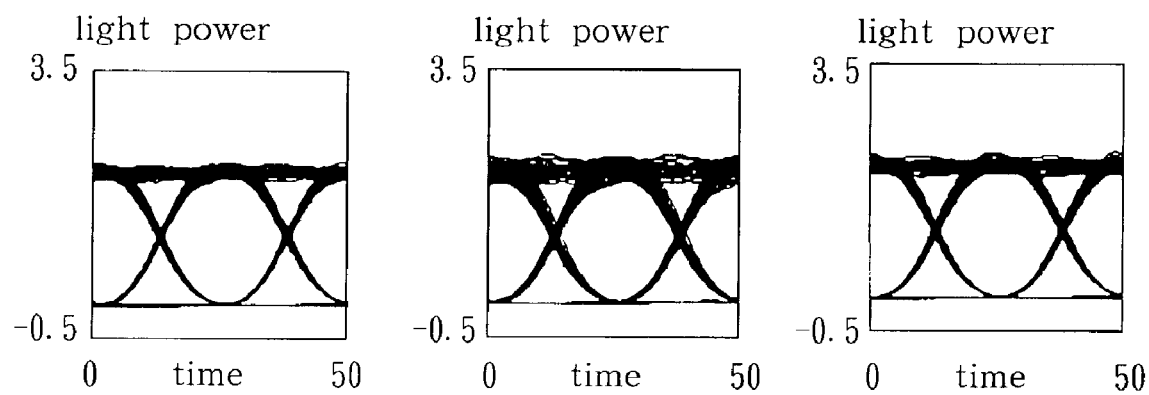
FIG. 36*a* to FIG. 36*c* show results of calculations of signal light waveforms injected to an optical transmission line and signal light waveforms ejected from the optical transmission line.
Figure 37:
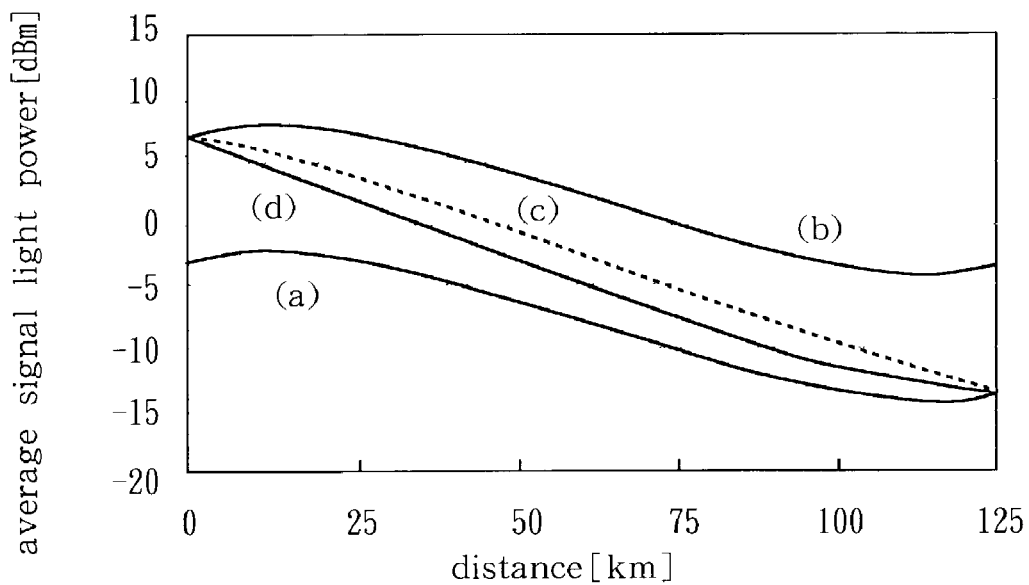
FIG. 37 shows a result of calculation of a simulated optical transmission line using Raman amplification.
Figures 38A, 38B, 38C:
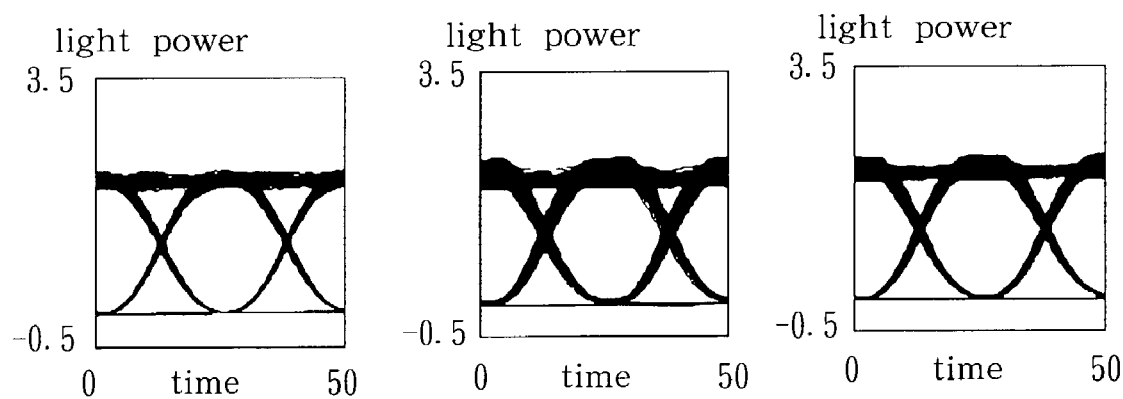
FIG. 38*a* to FIG. 38*c* show results of calculations of signal light waveforms injected to an optical transmission line and signal light waveforms ejected from the optical transmission line.

This will be described with reference to a result of calculation of a practical simulation shown in FIG. 35 and FIG. 36a to FIG. 36c. In FIG. 35, the abscissa indicates distance and the ordinate indicates average signal light power. For example, it is assumed that the system is initially operating with signal light power shown by curve (a) in FIG. 35. It is assumed that, as a transmission fiber, a single mode fiber 125 km long is used. A calculation result of wavelength of a typical wavelength channel of a signal light ejected from the optical transmission path is shown by a waveform in FIG. 36a. Signal bit rate is 40 Gbit/sec. In such situation, when the signal light power for all of the wavelength channels is decreased as shown by the curve (c) in FIG. 35, the prior art control is performed to make the power of the output signal light of the transmission fiber constant. It should be noted, however, that, in the prior art, the grain ratio control between the forward pumping and the backward pumping is not performed. Therefore, it is assumed that a total gain is simply increased while the gain ratio between the forward pumping and the backward pumping being kept constant. As a result, the average signal power becomes as shown by curve (b) in FIG. 35. In this example, the input signal light is reduced by 10 dB. As a result of the reduction of input signal light, degradation of signal quality due to Raman ASE is increased and the waveform of the signal light ejected from the optical transmission path becomes as shown by a waveform in FIG. 36b. From this, the increased degradation due to Raman ASE is clearly understood. Similar degradation occurs when loss of the transmission path is increased by 10 dB due to switching of connection of the fiber, etc. In the present invention, when input signal light is decreased, ratio of gain by the forward pumping is increased as shown by curve (d) in FIG. 35. In this example, gain by the forward pumping is about 200 times gain by the backward pumping. As a result, degradation of signal quality due to Raman ASE is suppressed and waveform of the signal light ejected from the optical transmission path becomes as shown by a waveform in FIG. 36c. From FIG. 36a to FIG. 36c, it is clear that, according to the present invention, degradation of signal quality is reduced, compared with the prior art, by controlling ratio of gain between the forward pumping and the backward pumping.

Figure 26:
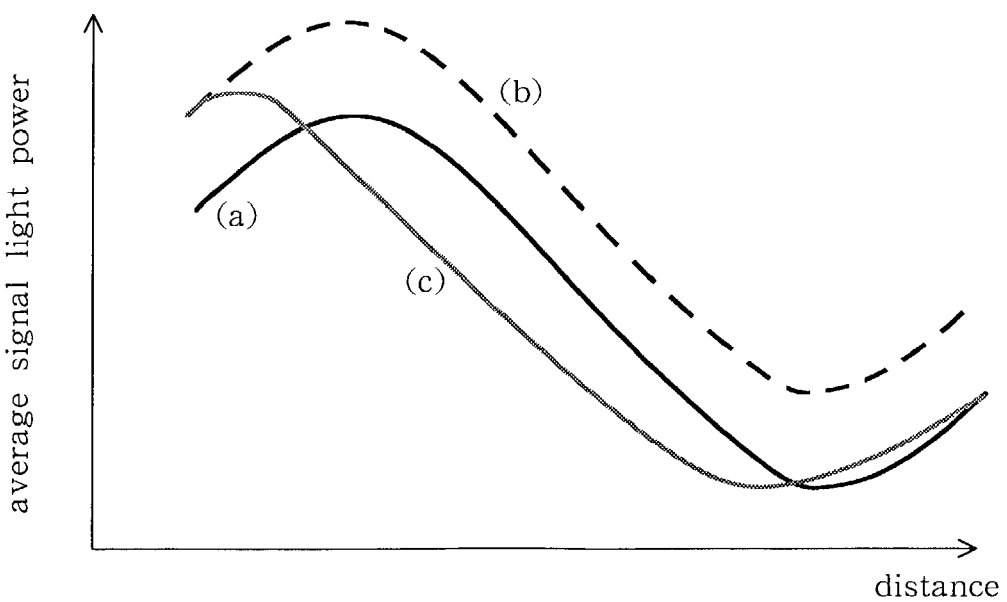
FIG. 26 shows variation of the signal power distribution under control of the present invention when the input signal light power is increased.
Figure 27:
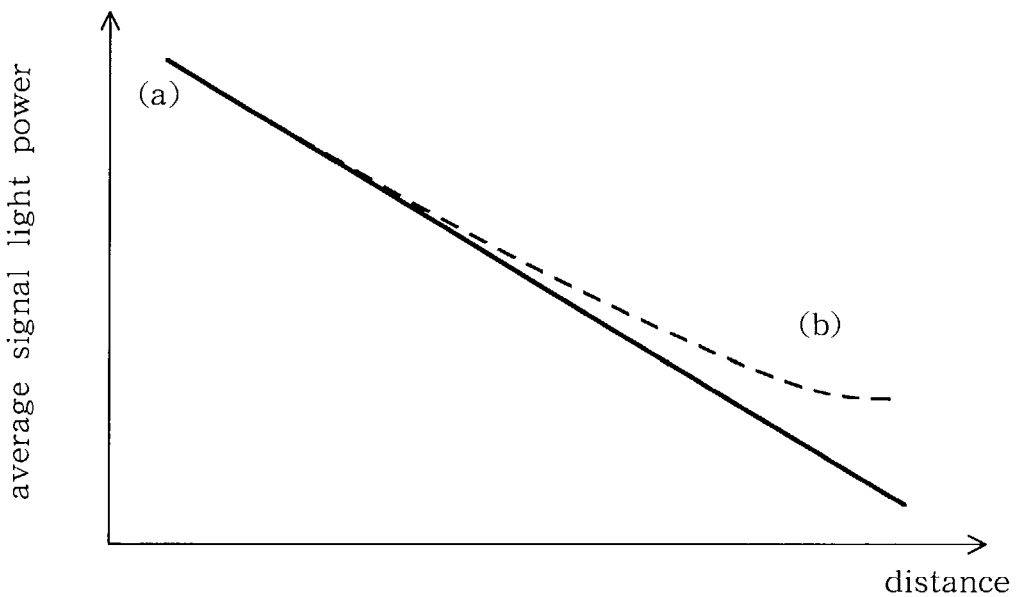
FIG. 27 shows variation of the signal power distribution when amplified by backward pumped Raman amplification.
Figure 28:
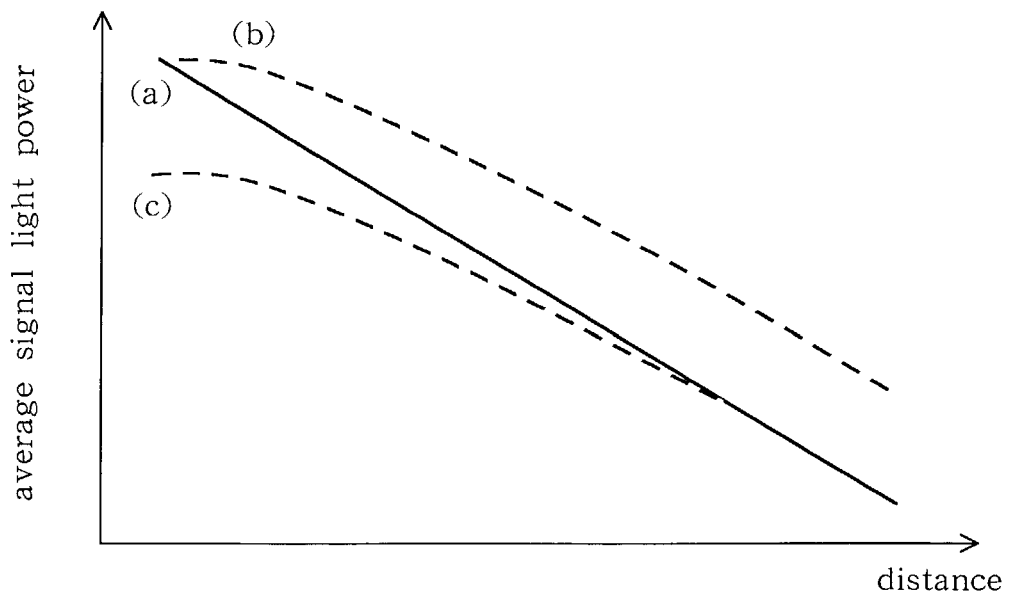
FIG. 28 shows variation of the signal power distribution when amplified by forward pumped Raman amplification.
Figure 29:
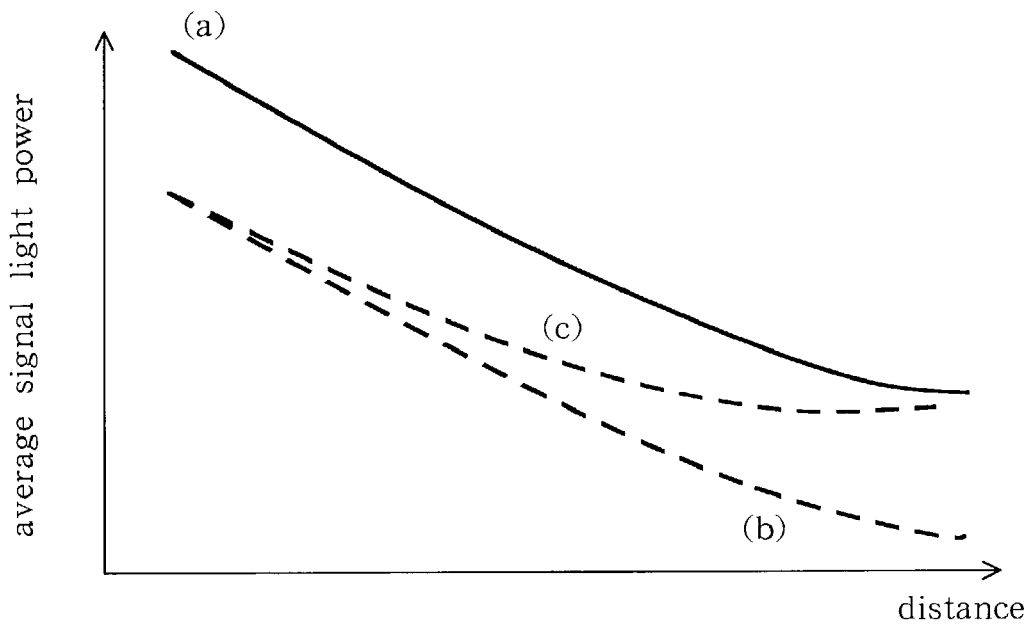
FIG. 29 shows variation of the signal power distribution under the conventional control in the backward pumping.
Figure 30:
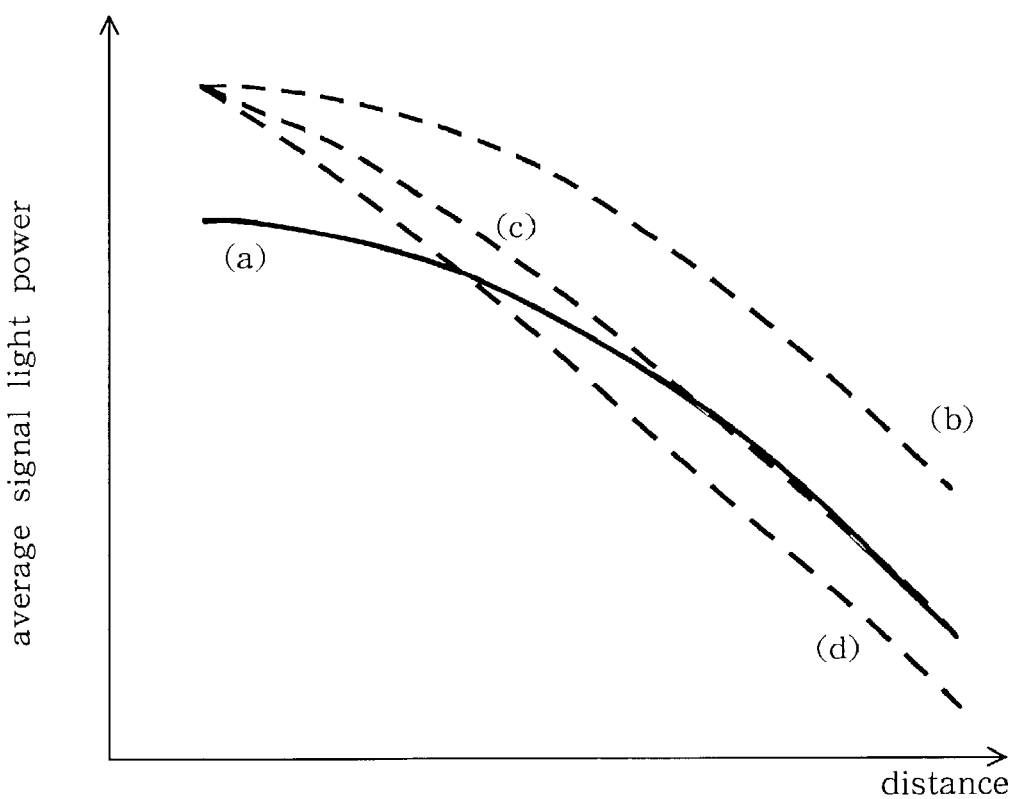
FIG. 30 shows variation of the signal power distribution under the conventional control in the backward pumping.
Figure 31:
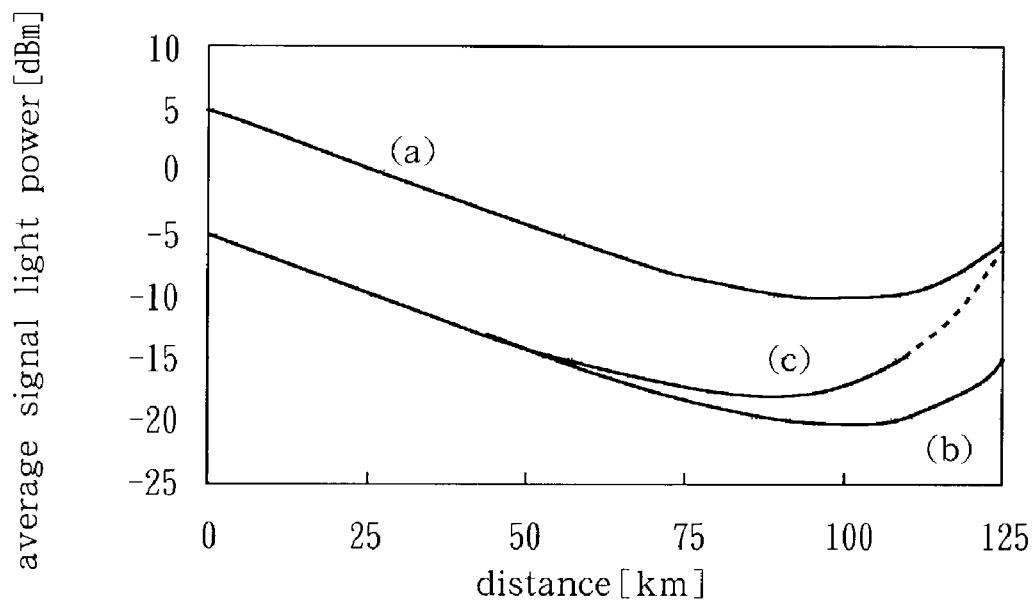
FIG. 31 shows a result of calculation of a simulated optical transmission system using Raman amplification.
Figures 32A, 32B, 32C:
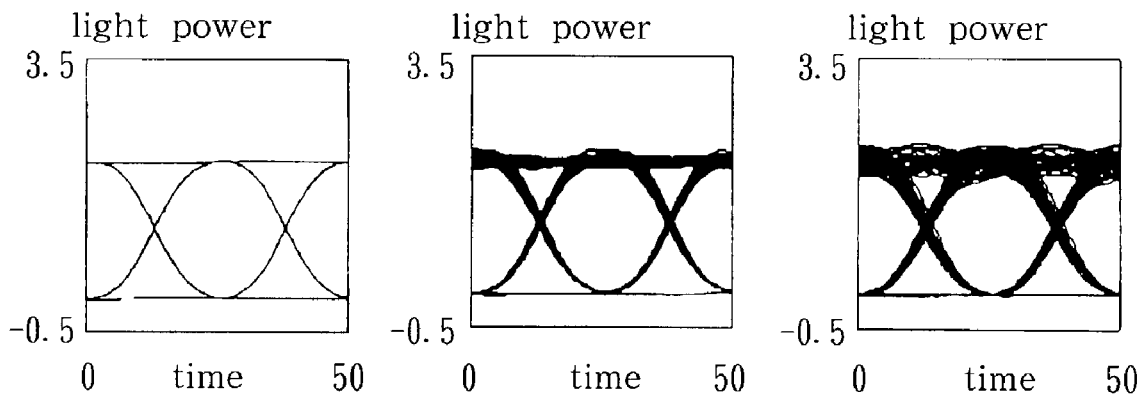
FIG. 32*a* to FIG. 32*c* show results of calculations of waveforms injected to the optical transmission line and waveforms ejected from the optical transmission line.
Figure 33:
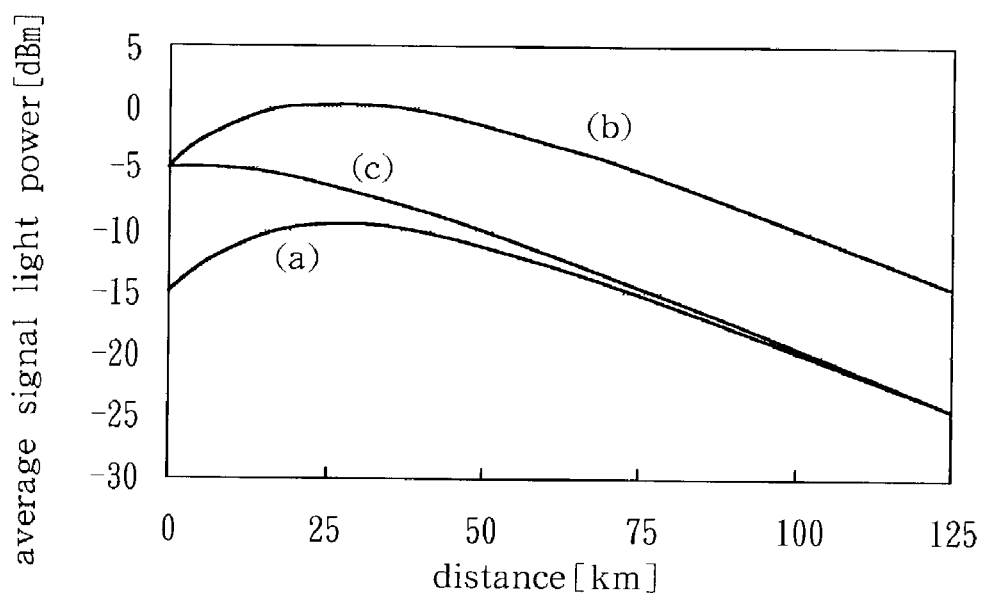
FIG. 33 shows a result of calculation of simulated optical transmission system using Raman amplification.
Figure 34A:
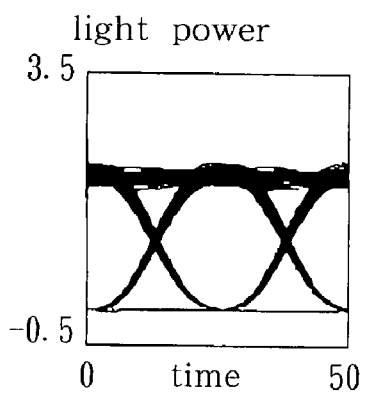
FIG. 34*a* and FIG. 34*b* show results of calculations of signal light waveforms injected to an optical transmission line and signal light waveforms ejected from the optical transmission line.
Figure 34B:
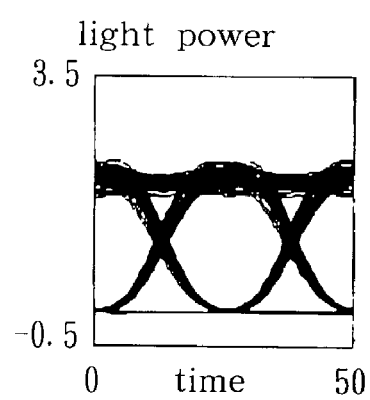

Further, it is assumed that the system is initially set to an optimal light power with which degradation of signal quality becomes minimum as shown in curve (a) in FIG. 26. In such state, when input signal light is increased for some reason while the wavelength characteristics is kept constant as shown by curve (b) in FIG. 26, an increase amount of the signal power is detected in the monitoring step and a control for reducing a rate of gain due to the forward pumping and increasing ratio of gain due to the backward pumping as shown by curve (c) in FIG. 26 is performed, together with a control of maintaining the output light power at constant, in the pumping control step. According to the prior art, degradation of signal quality occurs due to the additional nonlinear waveform distortion caused by the forward pumping is unavoidable when the light power is increased. In the present invention, however, such signal quality degradation is suppressed by reducing the ratio of the forward pumping, which provides large additional nonlinear waveform distortion.

This will be described by using a calculation on a practical simulation with reference to FIG. 37 and FIG. 38a to FIG. 38c. In the FIG. 37, the abscissa indicates distance of an optical fiber and the ordinate indicates average signal light power. For example, it is assumed that, initially, the system is operating with signal light power shown by curve (a) in FIG. 37. An transmission fiber may be a single mode optical fiber 125 km long. A waveform of a signal light ejected from the optical transmission line, which is obtained by calculation, is shown by a waveform in FIG. 38a. The signal bit rate is 40 Gbit/sec. When the signal light power over all of wavelength channels is increased as shown by curve (b) in FIG. 37, a control is performed to make power of the output signal light of the transmission line constant in the prior art. It should be remembered that, in the prior art, a ratio control of gains of the forward pumping and the backward pumping is not performed. Therefore, assuming that a total gain is simply reduced with ratio of gains due to the forward pumping and the backward pumping being constant, an average signal power becomes as shown by curve (c) in FIG. 37. In this example, a case where power of an input signal is increased by 10 dB is shown. As a result of the increase in the input signal light power, degradation of signal quality due to nonlinear waveform distortion is increased and a waveform of the signal light ejected from the optical transmission line becomes as shown by a waveform in FIG. 38b. From this waveform, it is clear that the signal quality degradation due to nonlinear waveform distortion is increased. In the present invention, however, when the input signal light is increased, ratio of gain due to the forward pumping is reduced as shown by curve (d) in FIG. 37. In this example, there is substantially no gain generated by the forward pumping and ratio thereof to gain generated by the backward pumping is substantially zero. As a result, the nonlinear waveform distortion is suppressed and a waveform of the signal light ejected from the optical transmission line becomes as shown by a waveform in FIG. 38c. From this, it is clear that degradation of signal quality is reduced, compared with the prior art, by controlling ratio of gains generated by the forward pumping and the backward pumping according to the present invention.

As described hereinbefore, a first one of the effects obtained by the present invention is that, even when power of an input signal light injected into a Raman amplification medium is varied, variation of signal quality is suppressed. The reason for this is that, when input signal light is decreased, ratio of gain obtained by the forward pumping with which generation of Raman ASE is small is increased to suppress the signal degradation due to Raman ASE and, when input signal light is increased, ratio of gain obtained by the backward pumping with which generation of additional nonlinear waveform distortion is small is increased to suppress the signal degradation due to additional nonlinear waveform distortion.

The second effect of the present invention is that degradation of signal quality due to Raman ASE as well as nonlinear waveform distortion is suppressed by changing ratio of gains due to the forward pumping and the backward pumping, while keeping power of signal light ejected from a Raman amplification medium constant. By keeping the output signal power at constant, it is possible to obtain uniform gain characteristics for wavelengths even when an optical amplifier constructed with an erbium-doped optical fiber is connected to an output terminal of the transmission line.

The third effect of the present invention is that it is possible to suppress degradation of signal quality due to Raman ASE as well as nonlinear waveform distortion by changing ratio of gains due to the forward pumping and the backward pumping and, simultaneously, to compensate for the tilting of the input signal power with respect to wavelengths thereof. That is, power of the output signal light becomes uniform for wavelengths even if the input signal power is tilted with respect to wavelengths thereof. As a result, it becomes possible to achieve uniform signal quality in all of wavelength channels.

The fourth effect of the present invention is that it is possible to suppress degradation of signal quality due to Raman ASE as well as nonlinear waveform distortion by changing ratio of gains due to the forward pumping and the backward pumping and, simultaneously, to make dispersion compensation possible. This is because it is possible in the present invention to use a dispersion compensation fiber as the Raman amplification medium.

The fifth effect of the present invention is that it is possible to apply the optical amplifier of the present invention to an optical fiber having various wavelength dispersion characteristics by arranging wavelengths of pump lights such that wavelengths of light wave generated by the nonlinearity effect between pump lights and/or between pimp light and input signal light are not included in a wavelength range of the input signal light. Further, it is possible to apply the optical communication system of the present invention to an optical fiber having various wavelength dispersion characteristics by using such allocation of wavelengths of the pump light in the optical communication system of the present invention.

What is claimed is:

1. An optical communication system,
   a Raman amplification medium;
   a pumping portion for injecting pump light giving the gain to signal light depending on the intensity of the pump light by induced Raman effect in said Raman amplification medium;
   a monitor portion for measuring only an input power of the signal light; and
   a control portion for controlling said pumping portion according a result of measurement by said monitor portion, said pumping portion including:
   a forward pumping portion provided in a transmitter, for injecting at least one forward pump light propagating in the same direction as the signal light in said Raman amplification medium; and
   a backward pumping portion provided in a receiver, for injecting at least one backward pump light propagating in the opposite direction to the signal light in said Raman amplification medium,
   said control portion including means for controlling ratio of the gain of the signal light by the backward pump light to the gain of the forward pump light based on the measurement performed by the monitor portion.
   said Raman amplification medium including an optical fiber as an optical transmission path connecting between said transmitter and said receiver, wherein sign of dispersion value of said optical fiber is negative in at least a portion of a wavelength range of the signal light and an absolute value thereof is 20 ps/nm/km or more in at least a portion of the wavelength range of the signal light.

2. An optical amplifier comprising:
   a Raman amplification medium;
   a pumping portion for injecting pump light for giving gain to a signal light depending on the intensity thereof by induced Raman effect to said Raman amplification medium;
   a monitor portion for measuring only input power of the signal light; and
   a control portion for controlling said pumping portion according to a result of measurement in said monitor portion,
   said pumping portion including:
   a forward pumping portion for injecting at least one forward pump light propagating in the same direction as the signal light in said Raman amplification medium;
   a backward pumping portion for injecting at least one backward pump light propagating in opposite direction to the signal light to said Raman amplification medium,
   said control portion including means for controlling a ratio of the gain given to the signal light by the backward pump light to the gain given to the signal light by the forward pump light according to the result of measurement in said monitor portion,
   wherein said control portion includes means for controlling the forward pump light and the backward pump light such that ratio of the gain of the forward pump to the gain of the backward pump light is reduced with increase in the input power of the signal light injected to said Raman amplification medium,
   wherein said pumping portion includes means for generating pump lights having a plurality of wavelengths as the forward pump light and the backward pump light and said control portion includes means for controlling the forward pump light and the backward pump light such that power of the signal light ejected from said Raman amplification medium becomes uniform for wavelengths thereof; and
   means for allocating wavelengths of the pump lights such that peak wavelength λmin of a shorter peak wavelength and peak wavelength λmax of longer peak wavelength of arbitrary two pumping lights of the plurality of wavelengths of the pump light generated by said forward pumping portion and minimum wavelength λshort of the wavelength range of the signal light and maximum wavelength λlong of the wavelength range of the signal light satisfy a relation:

λshort>λmin×λmax/(2. λmin−λmax)

or

λmin×λmax/(2λmin−λmax)>λlong.

3. An optical amplifier comprising:
   a Raman amplification medium;
   a pumping portion for injecting pump light for giving gain to a signal light depending on the intensity thereof by induced Raman effect to said Raman amplification medium;
   a monitor portion for measuring only input power of the signal light; and
   a control portion for controlling said pumping portion according to a result of measurement in said monitor portion,
   said pumping portion including:
   a forward pumping portion for injecting at least one forward pump light propagating in the same direction as the signal light in said Raman amplification medium;
   a backward pumping portion for injecting at least one backward pump light propagating in opposite direction to the signal light to said Raman amplification medium,
   said control portion including means for controlling a ratio of the gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump to the gain of the backward pump light is reduced with increase in the input power of the signal light injected to said Raman amplification medium, wherein said pumping portion includes means for generating pump lights having a plurality of wavelengths as the forward pump light and the backward pump light and said control portion includes means for controlling the forward pump light and the backward pump light such that power of the signal light ejected from said Raman amplification medium becomes uniform for wavelengths thereof; and means for allocating wavelengths of the pump lights such that arbitrary three pump lights of the plurality of the pump lights having different wavelengths, which have peak wavelengths satisfying the relation $\lambda min < \lambda mid < 80\ max,$ and minimum wavelength $\lambda short$ of the wavelength range of the signal light and maximum wavelength $\lambda long$ of the wavelength range of the signal light satisfy a relation:

$\lambda short > \lambda max \times \lambda mid \times \lambda min / (\lambda mid \times \lambda min - \lambda max \times \lambda mid + \lambda max \times \lambda min)$ or $\lambda max \times \lambda mid \times \lambda min / (\lambda mid \times \lambda min - \lambda max \times \lambda .mid + \lambda max \times \lambda min) > \lambda long.$ 4. An optical amplifier comprising:

a Raman amplification medium;

a pumping portion for injecting pump light for giving gain to a signal light depending on the intensity thereof by induced Raman effect to said Raman amplification medium;

a monitor portion for measuring only input power of the signal light; and a control portion for controlling said pumping portion according to a result of measurement in said monitor portion, said pumping portion including:

a forward pumping portion for injecting at least one forward pump light propagating in the same direction as the signal light in said Raman amplification medium;

a backward pumping portion for injecting at least one backward pump light propagating in opposite direction to the signal light to said Raman amplification medium, said control portion including means for controlling a ratio of the gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump to the gain of the backward pump light is reduced with increase in the input power of the signal light injected to said Raman amplification medium, wherein said pumping portion includes means for generating pump lights having a plurality of wavelengths as the forward pump light and the backward pump light and said control portion includes means for controlling the forward pump light and the backward pump light such that power of the signal light ejected from said Raman amplification medium becomes uniform for wavelengths thereof; and means for allocating or setting wavelengths of the pump lights and/or powers of the pump lights such that power of light waves generated by nonlinear effect occurring between pump lights generated by the forward pumping portion and/or between pump light and input optical signal becomes smaller than power of the signal light by 20 dB, that is, one hundredth or smaller, at any point of said Raman amplification medium within the wavelength range of the signal light.

5. An optical amplifier as claimed in claim 4, wherein the nonlinear effect is Four-Wave Mixing (FWM).

6. An optical amplifier comprising:

a Raman amplification medium;

a pumping portion for injecting pump light for giving gain to a signal light depending on the intensity thereof by induced Raman effect to said Raman amplification medium;

a monitor portion for measuring only input power of the signal light; and a control portion for controlling said pumping portion according to a result of measurement in said monitor portion, said pumping portion including:

a forward pumping portion for injecting at least one forward pump light propagating in the same direction as the signal light in said Raman amplification medium; and a backward pumping portion for injecting at least one backward pump light propagating in opposite direction to the signal light to said Raman amplification medium, said control portion including means for controlling a ratio of the gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump to the gain of the backward pump light is reduced with increase in the input power of the signal light injected to said Raman amplification medium, wherein said Raman amplification medium comprises an optical fiber and sign of dispersion value of said optical fiber is negative in at least a portion of the wavelength range of the signal light and the absolute value thereof is 20 ps/nm/km or more in at least a portion of the wavelength range of the signal light.

7. An optical amplifier comprising:

a Raman amplification medium;

a pumping portion for injecting pump light for giving gain to a signal light depending on the intensity thereof by induced Raman effect to said Raman amplification medium;

a monitor portion for measuring only input power of the signal light; and a control portion for controlling said pumping portion according to a result of measurement in said monitor portion, said pumping portion including:

a forward pumping portion for injecting at least one forward pump light propagating in the same direction as the signal light in said Raman amplification medium; and a backward pumping portion for injecting at least one backward pump light propagating in opposite direction to the signal light to said Raman amplification medium, said control portion including means for controlling a ratio of the gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump to the gain of the backward pump light is reduced with increase in the input power of the signal light injected to said Raman amplification medium, wherein said Raman amplification medium comprises an optical fiber and the absolute value of wavelength dispersion of said optical fiber is from 2 ps/nm/km to 10 ps/nm/km in at least a portion of the wavelength range of the signal light.

8. An optical amplifier comprising:

a Raman amplification medium;

a pumping portion for injecting pump light for giving gain to a signal light depending on the intensity thereof by induced Raman effect to said Raman amplification medium;

a monitor portion for measuring only input power of the signal light; and a control portion for controlling said pumping portion according to a result of measurement in said monitor portion, said pumping portion including:

a forward pumping portion for injecting at least one forward pump light propagating in the same direction as the signal light in said Raman amplification medium; and a backward pumping portion for injecting at least one backward pump light propagating in opposite direction to the signal light to said Raman amplification medium, said control portion including means for controlling a ratio of the gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump to the gain of the backward pump light is reduced with increase in the input power of the signal light injected to said Raman amplification medium, wherein said Raman amplification medium comprises an optical fiber and zero dispersion wavelength of said optical fiber is in the range from peak wavelength of a pump light among the pump lights, which has a minimum peak wavelength, to peak wavelength of a pump light having a maximum peak wavelength.

9. An optical amplifier comprising:

a pumping portion for injecting pump light for giving gain to signal light depending on the intensity thereof by induced Raman effect to said Raman amplification medium;

a monitor portion for measuring only input power of the signal light; and a control portion for controlling said pumping portion according to the result of measurement in said monitor portion, said pumping portion including:

a forward pumping portion for injecting at least one forward pump light propagating in the same direction as the signal light to said Raman amplification medium;

a backward pumping portion for injecting at least one backward pump light propagating in the opposite direction to the signal light in said Raman amplification medium, said control portion including means for controlling a ratio of gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump light to the gain of the backward pump light is reduced with increase in input power of the signal light injected to said Raman amplification medium, wherein said pumping portion includes means for generating pump light having a plurality of wavelengths and said control portion includes means for controlling the forward pump light and the backward pump light such that output power of the signal light ejected from said Raman amplification medium becomes uniform for wavelengths thereof; and means for allocating wavelengths of the pump lights such that peak wavelength $\lambda$min of a shorter peak wavelength and peak wavelength $\lambda$max of longer peak wavelength of arbitrary two pump lights of the plurality of wavelengths of the pump light generated by said forward pumping portion and minimum wavelength $\lambda$short of the wavelength range of the signal light and maximum wavelength $\lambda$long of the wavelength range of the signal light satisfy a relation:

$$\lambda short > \lambda min \times \lambda max / (2\lambda min - \lambda max)$$

or $$\lambda min \times \lambda max / (2\lambda min - \lambda max) > \lambda long.$$

10. An optical amplifier comprising:

a pumping portion for injecting pump light for giving gain to signal light depending on the intensity thereof by induced Raman effect to said Raman amplification medium;

a monitor portion for measuring only input power of the signal light; and a control portion for controlling said pumping portion according to the result of measurement in said monitor portion, said pumping portion including:

a forward pumping portion for injecting at least one forward pump light propagating in the same direction as the signal light to said Raman amplification medium;

a backward pumping portion for injecting at least one backward pump light propagating in the opposite direction to the signal light in said Raman amplification medium, said control portion including means for controlling a ratio of gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump light to the gain of the backward pump light is reduced with increase in input power of the signal light injected to said Raman amplification medium, wherein said pumping portion includes means for generating pump light having a plurality of wavelengths and said control portion includes means for controlling the forward pump light and the backward pump light such that output power of the signal light ejected from said Raman amplification medium becomes uniform for wavelengths thereof; and means for allocating wavelengths of the pump lights such that arbitrary three pump lights, of the plurality of the pump lights having different wavelengths, which have peak wavelengths satisfying the relation $\lambda min < \lambda mid < \lambda max$, and minimum wavelength $\lambda short$ of the wavelength range of the signal light and maximum wavelength $\lambda long$ of the wavelength range of the signal light satisfy a relation:

$\lambda short > \lambda max \times \lambda mid \times \pi min/(\lambda mid \times \lambda min - \lambda max \times \lambda mid + \lambda max \times \lambda min)$ or $\lambda max \times \lambda mid \times \lambda min/(2mid \times \lambda min - \lambda max \times \lambda mid + \lambda max \times \lambda min) > \lambda long$.

11. An optical amplifier comprising:

a pumping portion for injecting pump light for giving gain to signal light depending on the intensity thereof by induced Raman effect to said Raman amplification medium;

a monitor portion for measuring only input power of the signal light; and a control portion for controlling said pumping portion according to the result of measurement in said monitor portion, said pumping portion including:

a forward pumping portion for injecting at least one forward pump light propagating in the same direction as the signal light to said Raman amplification medium;

a backward pumping portion for injecting at least one backward pump light propagating in the opposite direction to the signal light in said Raman amplification medium, said control portion including means for controlling a ratio of gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump light to the gain of the backward pump light is reduced with increase in input power of the signal light injected to said Raman amplification medium, wherein said pumping portion includes means for generating pump light having a plurality of wavelengths and said control portion includes means for controlling the forward pump light and the backward pump light such that output power of the signal light ejected from said Raman amplification medium becomes uniform for wavelengths thereof; and means for allocating or setting wavelengths of the pump lights and/or powers of the pump lights such that power of light waves generated by nonlinear effect occurring between pump lights generated by the forward pumping portion and/or between pump light and input optical signal becomes smaller than power of the signal light by 20 dB, that is, one hundredth or smaller, at any point of said Raman amplification medium within the wavelength range of the signal light.

12. An optical amplifier as claimed in claim 11, wherein the nonlinear effect is Four-Wave Mixing (FWM).

13. An optical amplifier comprising:

a pumping portion for injecting pump light for giving gain to signal light depending on the intensity thereof by induced Raman effect to said Raman amplification medium;

a monitor portion for measuring only input power of the signal light; and a control portion for controlling said pumping portion according to the result of measurement in said monitor portion, said pumping portion including:

a forward pumping portion for injecting at least one forward pump light propagating in the same direction as the signal light to said Raman amplification medium; and a backward pumping portion for injecting at least one backward pump light propagating in the opposite direction to the signal light in said Raman amplification medium, said control portion including means for controlling a ratio of gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump light to the gain of the backward pump light is reduced with increase in input power of the signal light injected to said Raman amplification medium, wherein said Raman amplification medium comprises an optical fiber and sign of dispersion value of said optical fiber is negative in at least a portion of the wavelength range of the signal light and the absolute value thereof is 20 ps/nm/km or more in at least a portion of the wavelength range of the signal light.

14. An optical amplifier comprising:

a pumping portion for injecting pump light for giving gain to signal light depending on the intensity thereof by induced Raman effect to said Raman amplification medium;

a monitor portion for measuring only input power of the signal light; and a control portion for controlling said pumping portion according to the result of measurement in said monitor portion, said pumping portion including:

a forward pumping portion for injecting at least one forward pump light propagating in the same direction as the signal light to said Raman amplification medium; and a backward pumping portion for injecting at least one backward pump light propagating in the opposite direction to the signal light in said Raman amplification medium, said control portion including means for controlling a ratio of gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump light to the gain of the backward pump light is reduced with increase in input power of the signal light injected to said Raman amplification medium, wherein said Raman amplification medium comprises an optical fiber and the absolute value of wavelength dispersion of said optical fiber is from 2 ps/nm/km to 10 ps/nm/km in at least a portion of the wavelength range of the signal light.

15. An optical amplifier comprising:

a pumping portion for injecting pump light for giving gain to signal light depending on the intensity thereof by induced Raman effect to said Raman amplification medium;

a monitor portion for measuring only input power of the signal light; and a control portion for controlling said pumping portion according to the result of measurement in said monitor portion, said pumping portion including:

a forward pumping portion for injecting at least one forward pump light propagating in the same direction as the signal light to said Raman amplification medium; and a backward pumping portion for injecting at least one backward pump light propagating in the opposite direction to the signal light in said Raman amplification medium, said control portion including means for controlling a ratio of gain given to the signal light by the backward pump light to the gain given to the signal light by the forward pump light according to the result of measurement in said monitor portion, wherein said control portion includes means for controlling the forward pump light and the backward pump light such that ratio of the gain of the forward pump light to the gain of the backward pump light is reduced with increase in input power of the signal light injected to said Raman amplification medium, wherein said Raman amplification medium comprises an optical fiber and zero dispersion wavelength of said optical fiber is in the range from peak wavelength of a pump light among the pump lights, which has a minimum peak wavelength, to peak wavelength of a pump light having a maximum peak wavelength.

* * * * *